US007687173B2

(12) United States Patent
Cubukcu et al.

(10) Patent No.: US 7,687,173 B2
(45) Date of Patent: Mar. 30, 2010

(54) PROCESS FOR MAKING A CERAMIC COMPOSITE DEVICE

(75) Inventors: Esin Cubukcu, Auburn, OH (US); Steve Dahar, Solon, OH (US); Ravi Dodeja, Richmond Heights, OH (US); Arnold Z. Gordon, Beachwood, OH (US); Daniel Kalynchuk, University Heights, OH (US); Troy Shannon Prince, Cleveland, OH (US); Justin Soltesz, Wadsworth, OH (US); Michael D. Waite, Strongsville, OH (US)

(73) Assignee: IGR Enterprises, Beachwood, OH (US)

( * ) Notice: Subject to any disclaimer, the term of this patent is extended or adjusted under 35 U.S.C. 154(b) by 1069 days.

(21) Appl. No.: 10/612,330

(22) Filed: Jul. 2, 2003

(65) Prior Publication Data

US 2009/0294021 A1  Dec. 3, 2009

Related U.S. Application Data

(62) Division of application No. 09/592,190, filed on Jun. 12, 2000, now Pat. No. 6,703,153, which is a division of application No. 09/020,204, filed on Feb. 6, 1998, now Pat. No. 6,074,771.

(51) Int. Cl.
    *H01M 8/10* (2006.01)
(52) U.S. Cl. ............... 429/30; 429/34; 429/12; 427/115
(58) Field of Classification Search .......... 429/30, 429/34, 33, 40, 12, 35; 204/254, 267, 256, 204/268; 427/115; 29/623.5
    See application file for complete search history.

(56) References Cited

U.S. PATENT DOCUMENTS

| 4,528,083 A | * | 7/1985 | LaConti et al. ............ 204/265 |
|---|---|---|---|
| 4,659,448 A | | 4/1987 | Gordon |
| 4,764,488 A | | 8/1988 | Saito et al. |
| 4,789,561 A | | 12/1988 | Schaefer et al. |
| 4,867,902 A | | 9/1989 | Russell |
| 4,900,406 A | * | 2/1990 | Janssen et al. ............ 205/138 |
| 5,069,987 A | | 12/1991 | Gordon |
| 5,200,279 A | | 4/1993 | Draper et al. |
| 5,209,989 A | | 5/1993 | Ishihara et al. |
| 5,234,722 A | | 8/1993 | Ito et al. |
| 5,238,754 A | | 8/1993 | Yasuo et al. |
| 5,256,499 A | | 10/1993 | Minh et al. |
| 5,258,240 A | | 11/1993 | DiCroce et al. |
| 5,261,944 A | | 11/1993 | Lockhart et al. |
| H1260 H | | 12/1993 | Towe |
| 5,270,129 A | | 12/1993 | Ishida |
| 5,273,837 A | | 12/1993 | Aitken et al. |
| 5,279,906 A | | 1/1994 | Yoshimura et al. |
| 5,281,490 A | | 1/1994 | Nishioka et al. |
| 5,286,580 A | | 2/1994 | Ippommatsu et al. |
| 5,290,642 A | | 3/1994 | Minh et al. |
| 5,292,599 A | | 3/1994 | Soma et al. |
| 5,306,411 A | | 4/1994 | Mazanec et al. |
| 5,312,700 A | | 5/1994 | Ishida |
| 5,326,650 A | | 7/1994 | Ishida |
| 5,330,859 A | | 7/1994 | McPheeters et al. |
| 5,332,483 A | | 7/1994 | Gordon |
| 5,336,569 A | | 8/1994 | Misawa et al. |
| 5,342,703 A | | 8/1994 | Kawasaki et al. |
| 5,354,626 A | | 10/1994 | Kobayashi et al. |
| 5,358,735 A | | 10/1994 | Kawasaki et al. |
| 5,368,951 A | | 11/1994 | Shiratori et al. |
| 5,372,895 A | | 12/1994 | Sato et al. |
| 5,376,468 A | | 12/1994 | Arai et al. |
| 5,385,792 A | | 1/1995 | Shiratori et al. |
| 5,405,712 A | | 4/1995 | Yoshimura et al. |
| 5,409,371 A | | 4/1995 | Gordon |
| 5,413,879 A | | 5/1995 | Domaracki et al. |
| 5,418,081 A | | 5/1995 | Kawasaki et al. |
| 5,429,644 A | | 7/1995 | Arai et al. |
| 5,445,902 A | | 8/1995 | Soma et al. |
| 5,453,330 A | | 9/1995 | Kawasaki et al. |
| 5,460,897 A | | 10/1995 | Gibson et al. |
| 5,474,800 A | | 12/1995 | Matasuzaki |
| 5,480,739 A | | 1/1996 | Kawasaki et al. |
| 5,486,428 A | | 1/1996 | Gardner et al. |
| 5,496,655 A | | 3/1996 | Lessing |
| 5,500,306 A | | 3/1996 | Hsu et al. |
| 5,500,307 A | | 3/1996 | Anzai et al. |
| 5,514,353 A | | 5/1996 | Adlhart |

(Continued)

FOREIGN PATENT DOCUMENTS

EP  0668 622 A1  2/1994

(Continued)

OTHER PUBLICATIONS

Fuel Cells written by Nguyen Q. Minh at pp. 561-608, 1996.

(Continued)

*Primary Examiner*—Patrick Ryan
(74) *Attorney, Agent, or Firm*—Calfee, Halter & Griswold LLP

(57) ABSTRACT

An electrical power generating device having a plurality of ceramic composite cells, each cell having a cathode and an anode. A thermal shell in which the ceramic composite cells are stacked or arranged in electrical series and gas parallel surrounded by shock absorbing and insulating materials, respectively, is preferably included. Also provided are an exhaust fan, thermocouple sensors, a fuel supply, a programmable computer controller with user interface, and a container supporting the assembly and having passageways for providing air ingress and egress to the device, and power output terminals for the electrical power from the device.

Methods for manufacturing the ceramic composite cells are also provided, including a method for manufacturing stabilized zirconia and for use in the ceramic materials used within the ceramic composite cell.

27 Claims, 20 Drawing Sheets

U.S. PATENT DOCUMENTS

| | | |
|---|---|---|
| 5,518,830 A | 5/1996 | Worrell et al. |
| 5,527,633 A | 6/1996 | Kawasaki et al. |
| 5,531,019 A | 7/1996 | Taira et al. |
| 5,541,014 A | 7/1996 | Micheli et al. |
| 5,551,955 A | 9/1996 | Taira et al. |
| 5,554,454 A | 9/1996 | Gardner et al. |
| 5,573,867 A | 11/1996 | Zafred et al. |
| 5,585,203 A | 12/1996 | Chikagawa et al. |
| 5,589,017 A | 12/1996 | Minh |
| 5,591,537 A | 1/1997 | Bagger et al. |
| 5,595,833 A | 1/1997 | Gardner et al. |
| 5,614,127 A | 3/1997 | Khandkar et al. |
| 5,624,542 A | 4/1997 | Shen et al. |
| 6,074,771 A | 6/2000 | Cubukcu et al. |
| 6,132,573 A * | 10/2000 | Cubukcu et al. ............ 204/262 |
| 6,496,655 B1 | 12/2002 | Malloy Desormeaux |
| 6,592,965 B1 | 7/2003 | Gordon |
| 6,703,153 B1 | 3/2004 | Cubukcu et al. |

FOREIGN PATENT DOCUMENTS

| | | | |
|---|---|---|---|
| WO | WO 94/06545 A1 | 3/1994 | |
| WO | WO 94/26684 A1 | 7/1997 | |

OTHER PUBLICATIONS

Fuel Cells and Their Applications by Karl Kordesch and Günter Simader. Republic of Germany, 1996. Solid Oxide Fuel Cells (SOFC) at pp. 133-151.

Fuel Cell Technology: Status and Future Prospects written by A.J. Appleby at pp. 521-653, 1993.

A Small Portable Proton Exchange Membrane Fuel Cell and Hydrogen Generator for Medical Applications written by Otto J. Adlhart, Peter Rohonyi, Dean Modroukas and Jack Driller. ASAIO Journal, 1997.

Progress in Planar SOFC Science and Technology by A.C. Khandkar, S. Elangovan and J.J. Hartvigsen, 1996.

Solid Oxide Fuel Cells: Materials and Technology by Timothy R. Armstrong and Jeffry W. Stevenson, 1996.

The Westinghouse Solid Oxide Fuel Cell Program, 1996 IEEE. A Status Report written by Stephen E. Veyo.

Get Your $O_2$'s High Temperature Electroceramic Oxygen Separation and Reaction. Written by T.J. Mazanec. The Electrochemical Society Interface—Winter 1996.

* cited by examiner

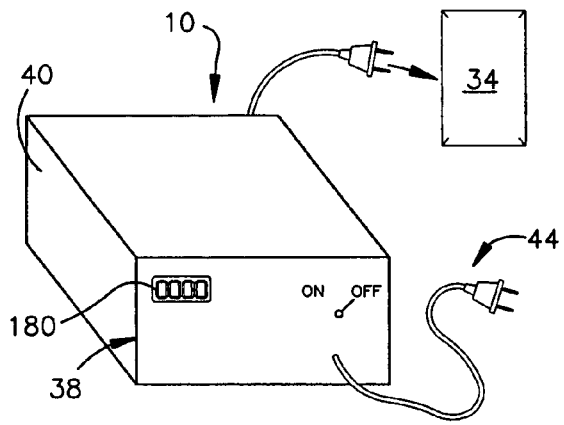
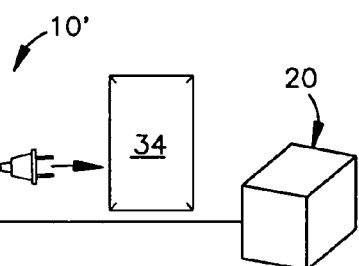
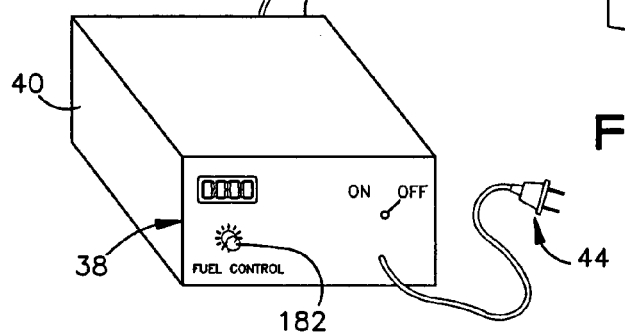
Fig.1
Fig.1A
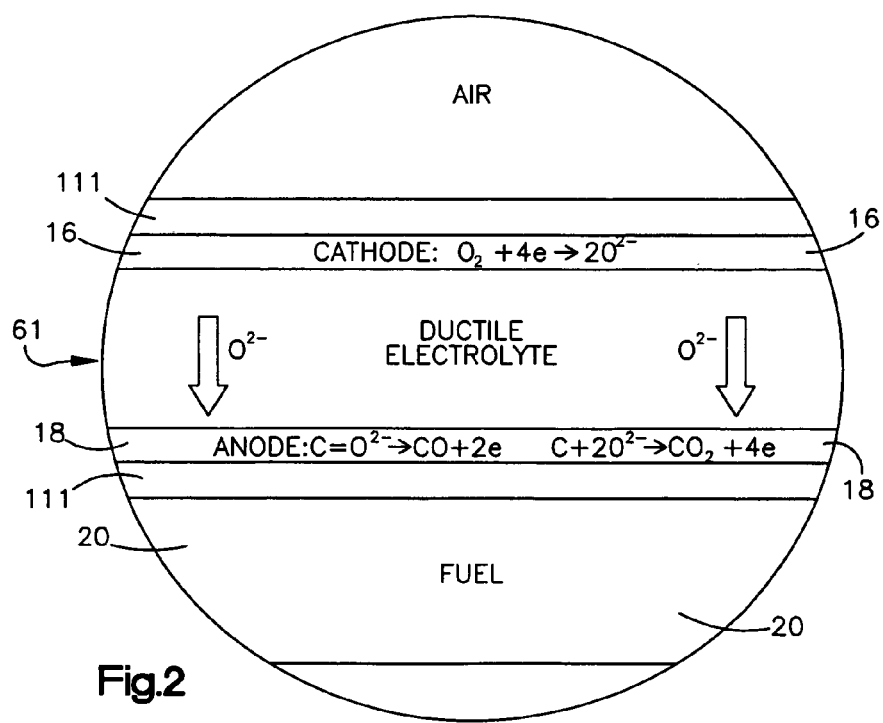
Fig.2

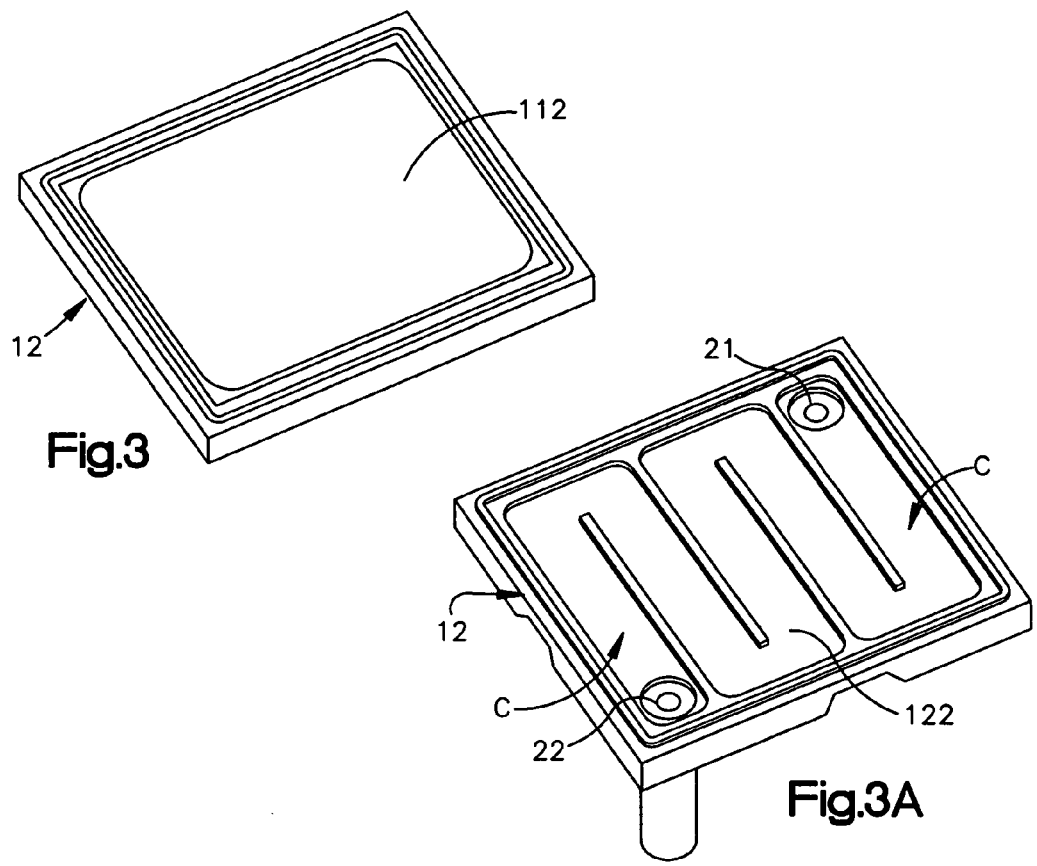
Fig.3
Fig.3A
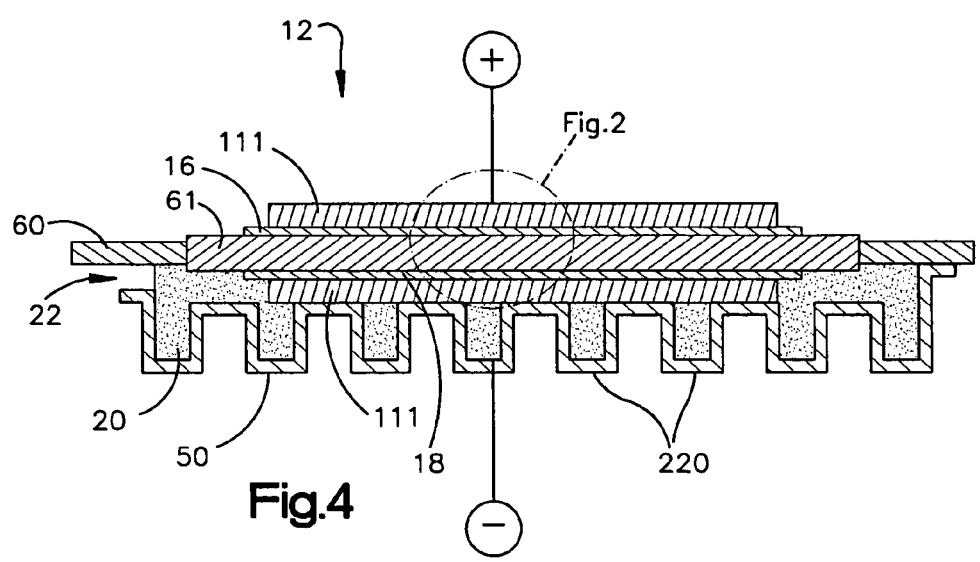
Fig.4

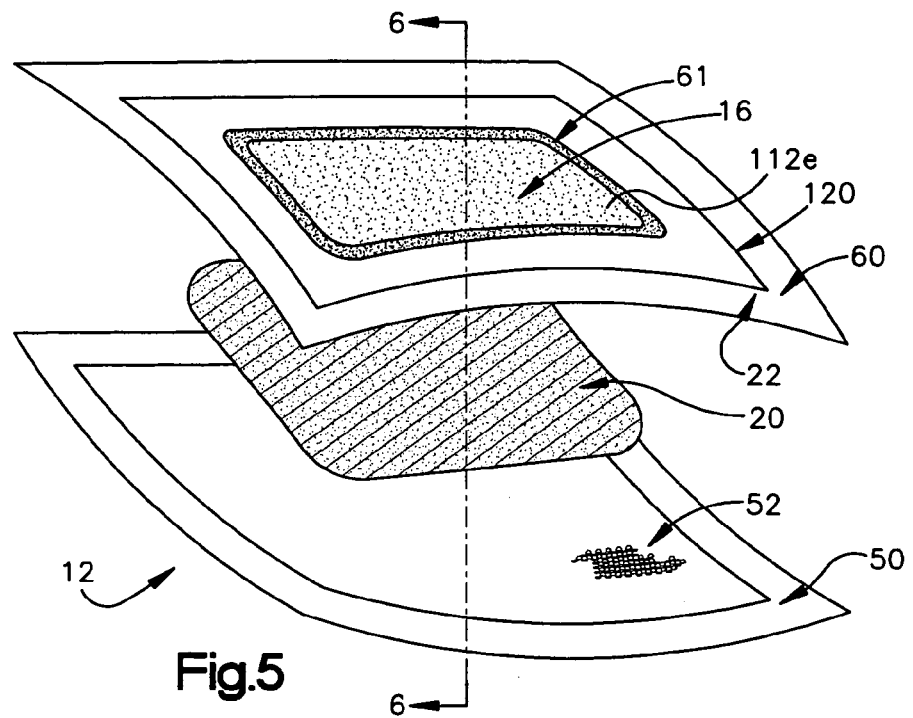
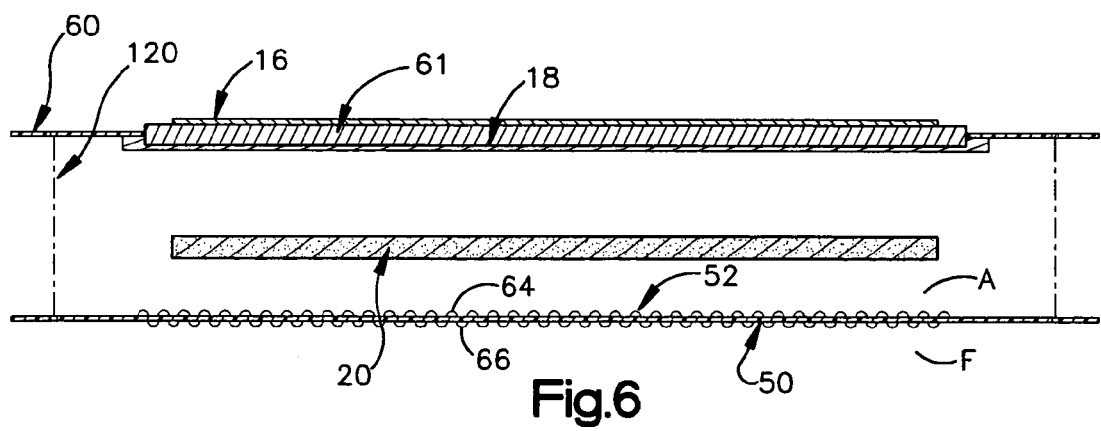

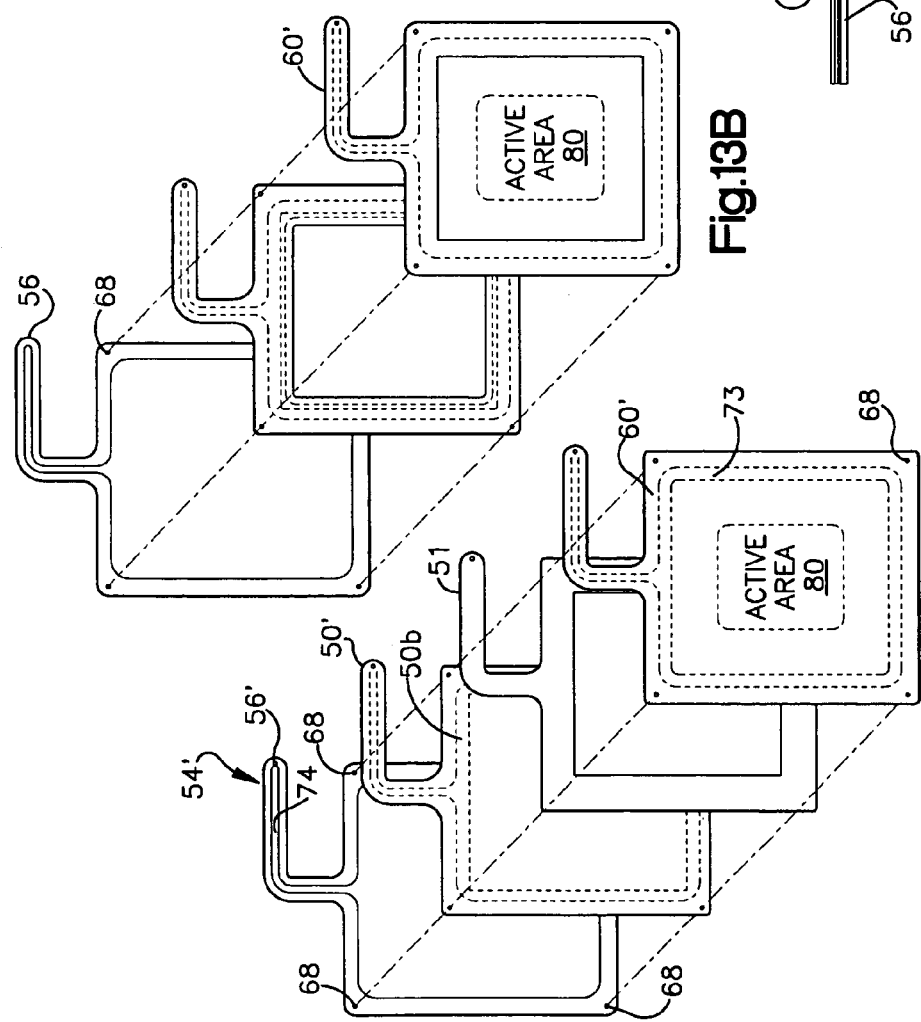

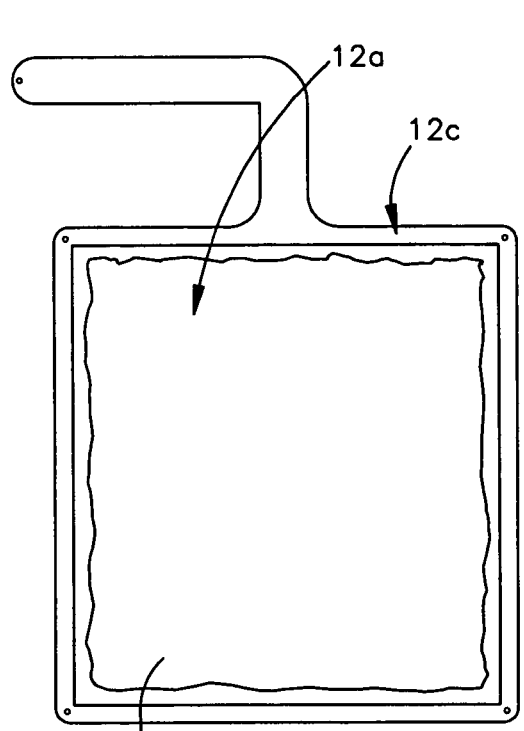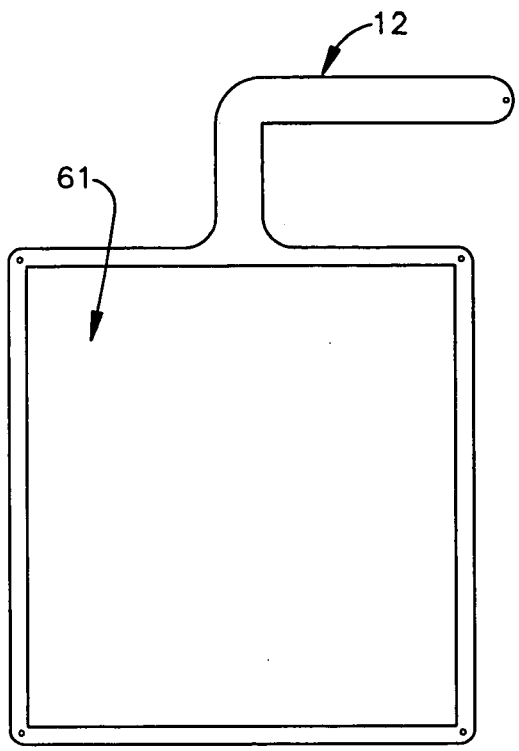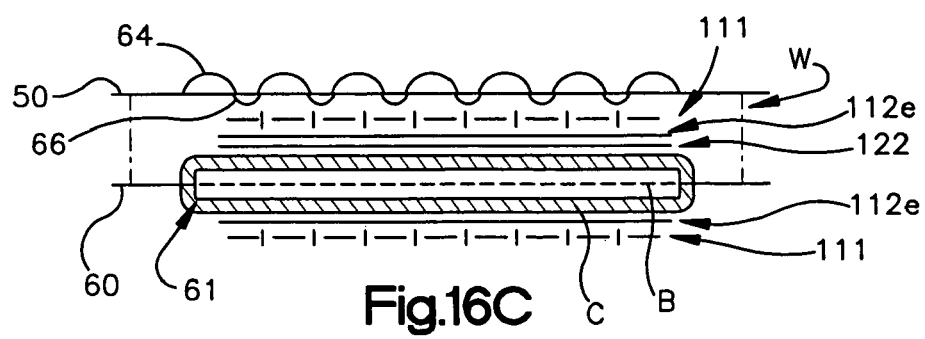

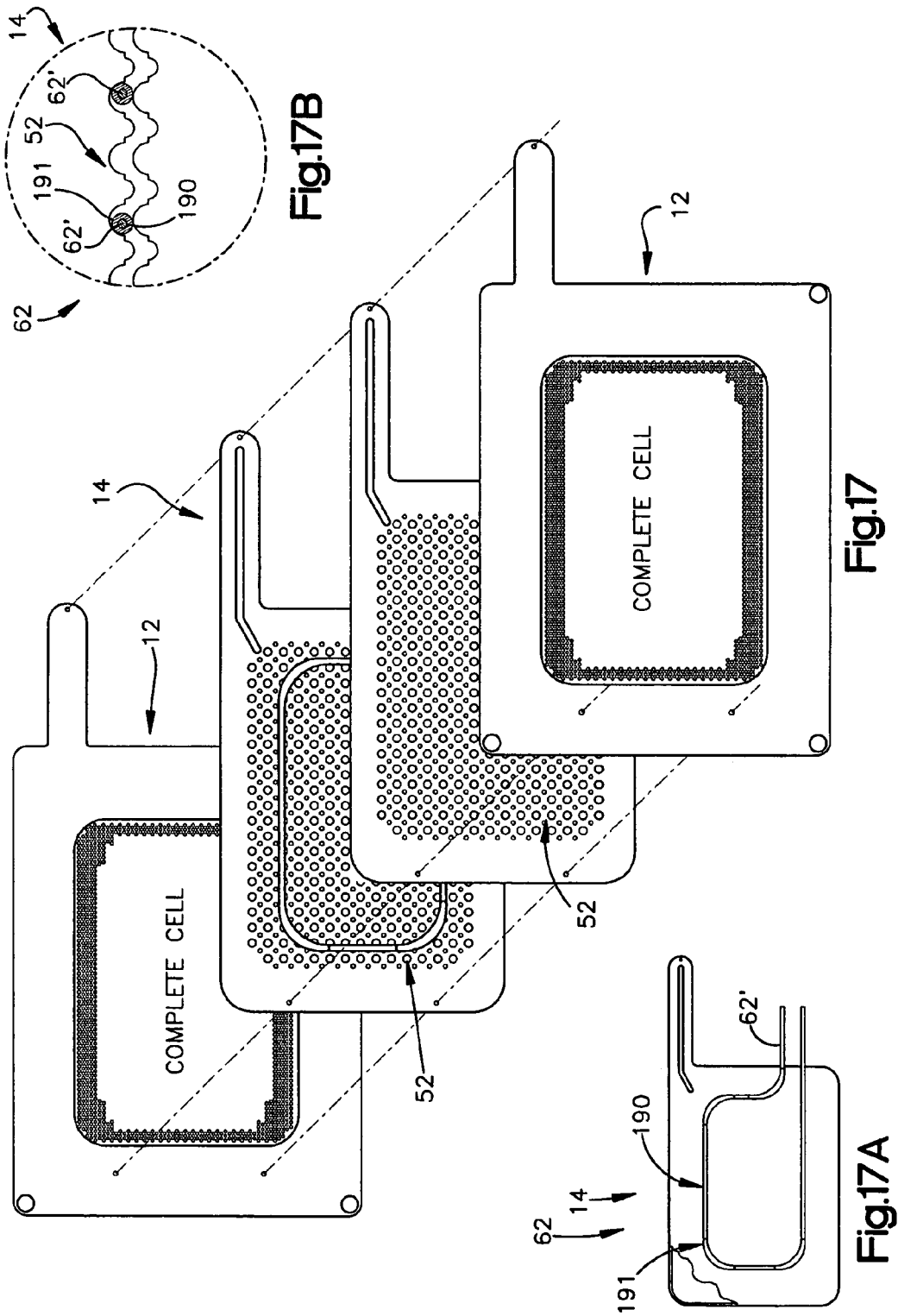

PROCESS FOR MAKING A CERAMIC COMPOSITE DEVICE

This application is a division of U.S. application Ser. No. 09/592,190, filed Jun. 12, 2000, now U.S. Pat. No. 6,703,153, issued Mar. 9, 2004, which is division of U.S. application Ser. No. 09/020,204, filed Feb. 6, 1998, now U.S. Pat. No. 6,074,771, issued Jun. 13, 2000.

TECHNICAL FIELD

The present invention relates generally to a ceramic composite electrolytic device, and, more specifically, to a device and methods for manufacturing a ceramic composite electrolytic device for use in the generation of electrical power and heat.

BACKGROUND

In the past, stationary, vehicular and portable ceramic composite electrolytic devices such as fuel cells for generating electric power and heat or for generating oxygen, have been difficult to manufacture for numerous reasons. First, numerous prior art devices used ceramic-to-ceramic type fabrication techniques which resulted in a product which was not sufficiently tough to be reliable during transport or usage. The ceramic-to-ceramic interface was brittle and would tend to crack readily. Additionally, fabrication costs for such units were high due to the use of expensive ceramic materials, together with complicated manufacturing methods. The high temperature at which such devices must operate limited the choice of materials for use in the devices. Where metals were used, high operating temperatures tended to weaken the metals as well as increase their corrosion and oxidation rates. As a result, expensive ceramic materials were used. Such materials have had difficulties including cracking and failure of the seals. These difficulties are made worse in the event of shock, vibration and thermal cycling to high operating temperatures. Fabrication techniques may also have included expensive permanent or hermetic gas seals, which were often unsuccessful. Prior art units also tend to be too large to meet desired space and weight requirements. Moreover, such devices were unable to meet desired power requirements despite such additional disadvantages. For example, in the case of a stack of small cells having continuous output requirements for use in a micro-vehicle, minimal output such as a few Watts are desired. In a larger vehicle, manned or unmanned, power outputs are generally desired to be in the range of 1-100 kWatts. For large vehicles or stationary power supplies, for example for utility power, megawatt requirements may be desired. Devices of this type would preferably have relatively small physical dimensions.

Additional disadvantages with prior art techniques are set forth in the background of U.S. Pat. No. 5,069,987 concerning electrical power generation, which is incorporated herein by reference. Still further enhancements continue to be made to the mechanical properties of ceramic cell technology as discussed in U.S. Pat. No. 5,624,542. However, such improvements continue to have disadvantages, including the use of large amounts of expensive precious metals such as silver and palladium. Also, the use of increased amounts of metal in the composite result in undesirable direct electrical connections, which limit the usefulness of the cell in certain applications.

SUMMARY OF THE INVENTION

According to the present invention, a ceramic composite electrolytic device is provided which may be used for generation of electric power or heat. In the power generation system or device of the present application, a reliable, mechanically rugged device is provided. In particular, such device may be stationary, vehicular and/or portable, and is capable of delivering electrical power at a desired wattage, which in various embodiments may be from a few watts to a kilo or mega watt output. In the fuel cell device embodiment of the present application, an efficient, economical, relatively light weight, reliable, mechanically rugged device, which has reduced pollutant emissions is provided. Such devices are advantageously used in the production of electrical power at any required location where electric power conversion from fuel is needed, generation of power for electrically powered vehicles, or generation of electric power from methane produced by land fills, as a few examples, or in military aircraft or life support systems, for example in small unmanned aerial vehicles for use in military surveillance. Additionally, Such electrical generators may be used as the power source for an oxygen generator device.

The present device is a solid-state electrochemical source of electrical power which is maintenance free. The present device has a preferred fluid fuel embodiment and a solid fuel embodiment. In the pre-loaded solid fuel embodiment the use of fuel tanks, pumps, lines and fuel processing is eliminated, which significantly reduces difficulties with volume and weight constraints.

When the system is heated to its comparatively lower operating temperature of between 500° C. and 1200° C., the device spontaneously produces power making use of the transportability of ions, such as oxide ions ($O^{-2}$), or hydroxide ions ($OH^-$), across an electrolytic ductile ceramic barrier. According to Faraday's law, amperage is proportional to the number of electrons transferred per carbon (C) atom multiplied by Faraday's constant (approximately 96,500). (A= ($\#e^-/C_{atom}$)(F)(gmoles C/second). Thus, for the production of carbon monoxide (CO) from carbon the number of electrons transferred is 2, and for carbon dioxide ($CO_2$) from carbon the number is 4. As a result, amperage of the cell equals (2)(96,500)(gmoles C/second) for CO production from carbon. Thus, the rate of fuel consumption may be controlled by electronic control of the amperage through the device. It is noted that each gram-mole of carbon weights 12.0 grams. At a nominal current of 27 amps, each cell in the device will electrochemically consume about 100 mg of carbon per minute, if the carbon is converted to carbon monoxide. If carbon dioxide is produced, only about 50 mg C/min. is consumed.

Further advantages are obtained with the present device since the embodiments are less costly to manufacture, due to their substantial use of common, inexpensive stainless steels. The use of such metals enables the use of metal-to-metal welds for the high temperature seals and other connections. Also, the use of flexible solid electrolytes within cells of the device increases its life, due to the relative ductile, flexible, fracture tough, solid ceramic and metal composite materials.

Other features and advantages the present device will become apparent from the following detailed description of the preferred embodiments made with reference to the accompanying drawings, which form a part of the specification.

BRIEF DESCRIPTION OF DRAWINGS

In the accompanying drawings, which are incorporated in and constitute a part of this specification, embodiments of the devices described are illustrated, and together with the general description above, and the detailed description below, exemplify the present invention.

FIG. 1 is a schematic illustration of one solid fuel embodiment of an electrical power generating device of the present application;

FIG. 1A is a schematic illustration of an alternate embodiment of an electrical power generating device using fluid fuel;

FIG. 2 is a schematic representation of a ceramic composite cell of the device showing the flow of electron exchange through the device during operation;

FIG. 3 is a schematic perspective view of the fluid fuel embodiment of a ceramic composite cell of the device of the present application;

FIG. 3A is a schematic, perspective, cut-away view showing the inside of the cell of FIG. 3;

FIG. 4 is a schematic cross-sectional diagram showing various component flows through the solid fuel embodiment of the ceramic composite cell of the device during operation;

FIG. 5 is a schematic exploded view of a solid fuel embodiment of a ceramic composite cell of the device;

FIG. 6 is a schematic, exploded, cross-sectional view of a ceramic composite cell taken along the line 6-6 of FIG. 5;

FIGS. 13A, 13B and 13C comprise a series of partial, schematic, exploded views of the components of a fluid fuel embodiment of the ceramic composite cell of the device of the present invention showing these components in an unassembled condition (FIG. 13A), a partially assembled condition (FIG. 13B), and an assembled condition FIG. 13C).

FIG. 14 is a partial, cut-away, cross-sectional view of the components of the embodiment taken along the line 14-14 in FIG. 13;

FIG. 14A is a schematic, cross-sectional view of an alternate embodiment of the components of FIG. 13;

FIG. 16A is a schematic illustration of one side of a photolithographic foil member supporting an electrocatalyst in a fluid fuel embodiment of the device;

FIG. 16B is a schematic illustration of the opposite side of the member of FIG. 16A;

FIG. 16C is a schematic, cross-sectional view illustrating the order of the layers and members of the cells of the present device;

FIG. 17 is a schematic, exploded view of components of one embodiment of the heat element of the present device positioned intermediate the ceramic composite cells;

FIG. 17A is a schematic, top plan view of the embodiment of the heat element of FIG. 17;

FIG. 17B is a schematic cut-away, cross-sectional view showing the heat element engaged intermediate the foil members in the embodiment of the device of FIG. 17;

DETAILED DESCRIPTION OF THE PREFERRED EMBODIMENTS

Figure 7:
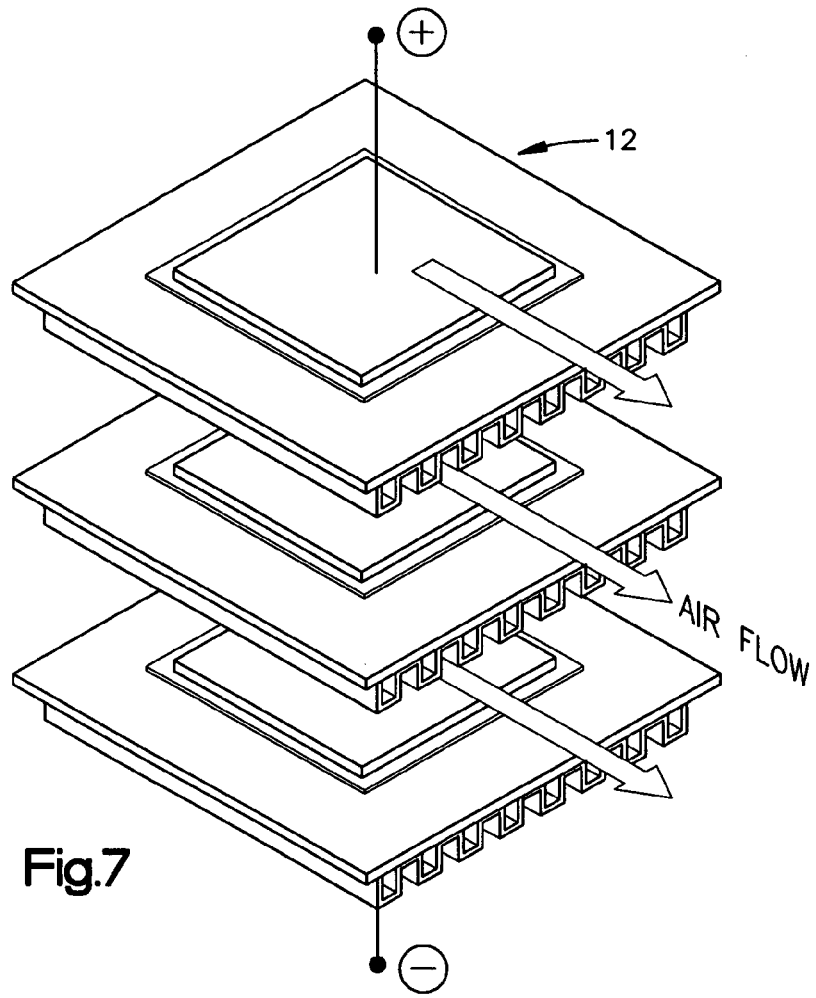
FIG. 7 is a schematic exploded view of a stack of ceramic composite cells of the device during operation.

FIG. 1 is a schematic illustration of the improved electrical power generating device 10 disclosed using a solid oxide fuel cell and solid fuel. FIG. 1A is a schematic illustration of an alternate embodiment of the improved electrical power generating system using fuel, which may be a liquid or a gas at room temperature. As used herein, the term fluid is intended to mean fuel, which at room temperature, is either a liquid, gas or vapor. As illustrated in the Figures, the device preferably includes: ceramic composite cells 12, a resistance heat element 14, a cathode 16 and an anode 18, a fuel supply 20, a fuel input 21, a gas output passageway 22 from each of the cells, a thermal shell 24 in which the ceramic composite cells are stacked or arranged in electrical series and gas parallel surrounded by shock absorbing and insulating materials 26, 28, respectively, a fan 30, thermocouple sensors 32, a power source 34, a programmable computer controller 36 with user interface 38, and a container 40 supporting the computer user interface 38 and having passageways 42 for providing air into the device 10 and a power output 44 for supplying electricity from the device.

It is noted that the present device incorporates two types of preferred embodiments: one supporting solid fuel within the composite cells or pre-loaded cells, and a second enabling the supply of fluid (liquid, gas or vapor) fuel to each of the cells. In the fluid fuel embodiment, the fuel may be JP-8, or methane, or an alcohol or gasoline or other similar fuel fluid. In the solid fuel embodiment, the fuel is preferably a conventional high surface area carbon, such as a carbon powder or charcoal briquette. Alternative solid fuels include titanium, titanium aluminide, or other metals and alloys which preferably do not melt under operational conditions and are light in weight. Other oxidizable material may also be used as solid fuels, such as carbides and hydrides, for example, aluminum carbide, and borohydride. Where oxidizable fuels are used which do not result in a gas phase exhaust, no exhaust means are generally required. However, such exhausts may result in weight reductions desirable in a specific design. In each of the embodiments, fully or partially oxidized fuel is exhausted from each of the cells. Various forms of each of these embodiments are described and illustrated. Where the components of these embodiments are similar, their features are not discussed further, and are referred to as the same designation or using prime designations.

In the illustrated embodiment of FIGS. 8-11, the cells 12 are approximately 8 in. by 14 in. in overall dimension, or approximately 7 in. by 10 in. in overall dimension in the FIG. 13 embodiment, and may have a thickness of approximately 0.005 to 0.20 inches. Generally, approximately 5-20 cells may be stacked per linear inch of height, for approximately 5 inches, depending on the desired power level. In other words, the number of cells multiplied by the voltage per cell (perhaps 0.5 V in the example embodiment), yields the desired stack voltage. The container 40 is of a size and weight which depends on the specifics of the selected embodiment and the desired output of power. The arrangement of the described embodiment illustrated results in output from the device of approximately 1500 Watts at 55-65 Volts. However, it should be understood that in the event larger or smaller output is desired, adjustment of the dimensions of the cells (to increase or decrease the surface area or volume of the cells), as well as the number of cells used, may be required. Alternatively, or additionally, the device may be operated at a higher or lower current density to obtain the desired output. As set forth in Table 1, various design parameters are possible depending on the desired design criteria.

Ceramic Composite Cells

Figure 12:
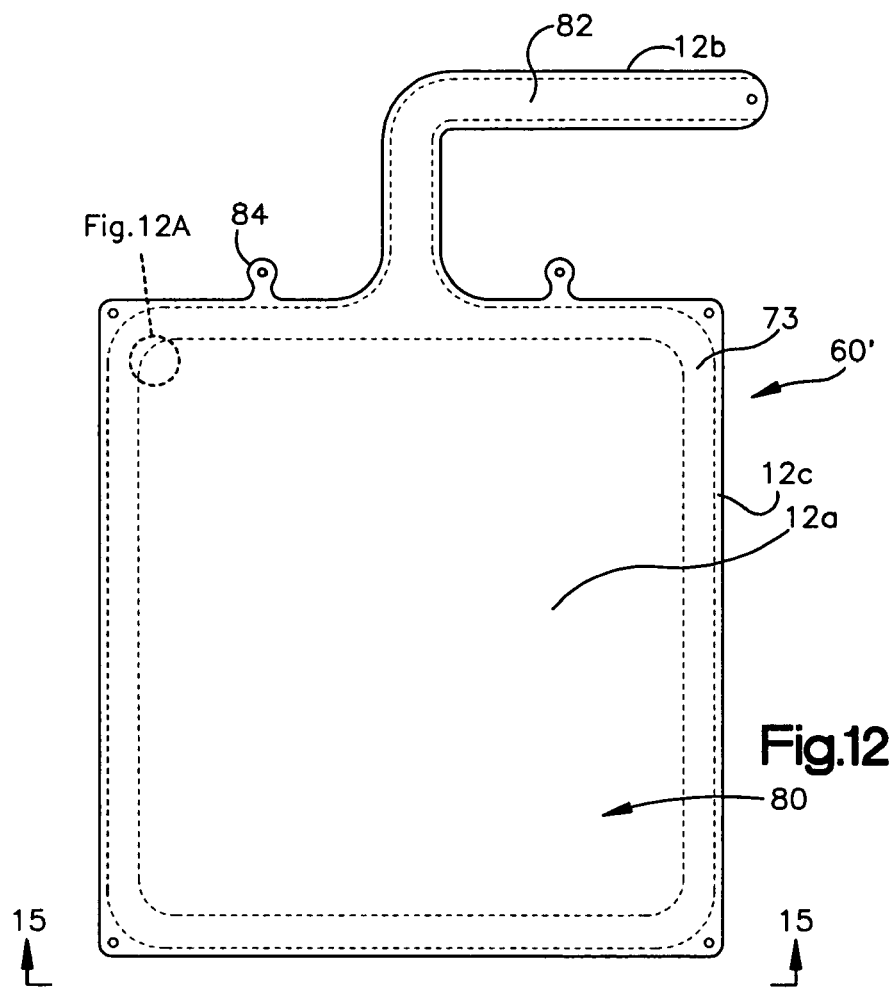
FIG. 12 is a schematic, top plan view of a fluid or solid fuel embodiment of the photolithographic foil member of the ceramic composite cell of the device of the present application.
Figure 12A:
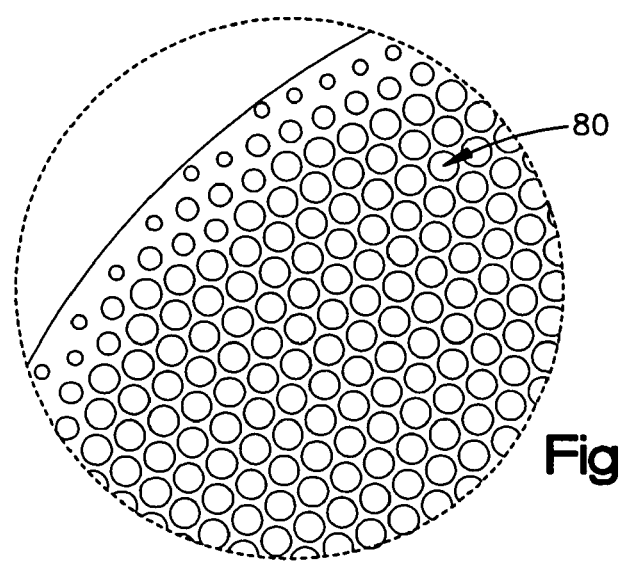
FIG. 12A is a schematic view of the embodiment of the photolithographic foil member indicated at 11 in FIG. 11.

Turning first to a discussion of the preferred embodiment of the ceramic composite cells 12, components of which are illustrated in FIGS. 2 to 15, the cells of the embodiments of the present device include the following components: a bipolar foil 50, preferably having an embossed three dimensional, two direction dimple pattern 52 as illustrated in FIGS. 5, 6, 9 and 10, which supports an electrical contact layer 112; a frame 54' having optional opposite first and second frame members secured together to surround, support and engage components of the cell, one of these frame members being shown at 56 in FIGS. 13A and 13B; a photolithographic foil member 60, 60' (FIGS. 11, 12) preferably having a hole pattern which is typically hexagonal close packed, or honeycomb, is illustrated in FIG. 12A and supports the preferred ceramic material; and an optional cell heat element 62, which may include a layer of insulation 191, is illustrated in FIGS. 17-17B.

Figure 8:
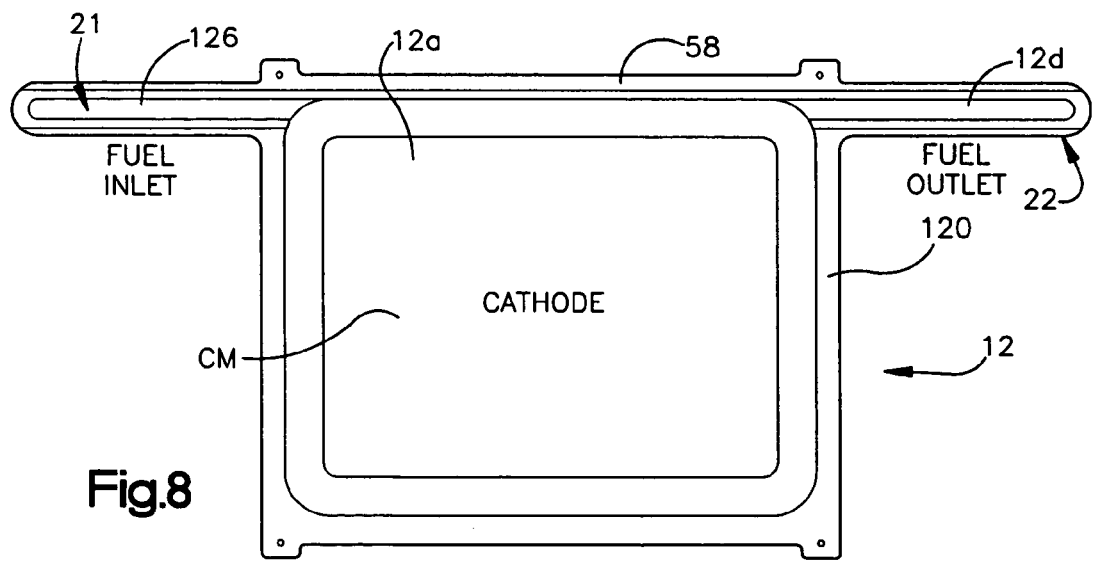
FIG. 8 is a schematic, top plan view of one embodiment of an assembled ceramic composite cell of the fluid fuel cell device of the present application.
Figure 9:
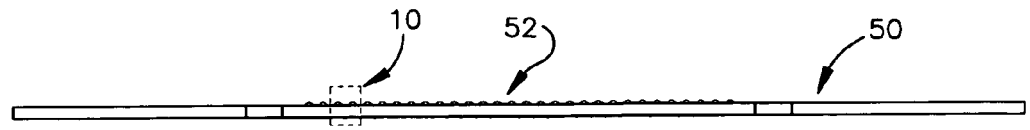
FIG. 9 is a schematic, side view of a portion of the embodiment of the ceramic composite cell taken along the line 9-9 of FIG. 8.
Figure 10:
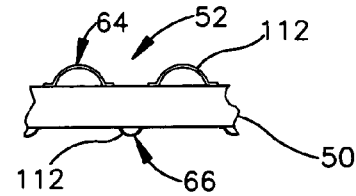
FIG. 10 is a cut-away portion of the schematic, side view of the portion of the ceramic composite cell within the box indicated 10 in FIG. 9.
Figure 11:
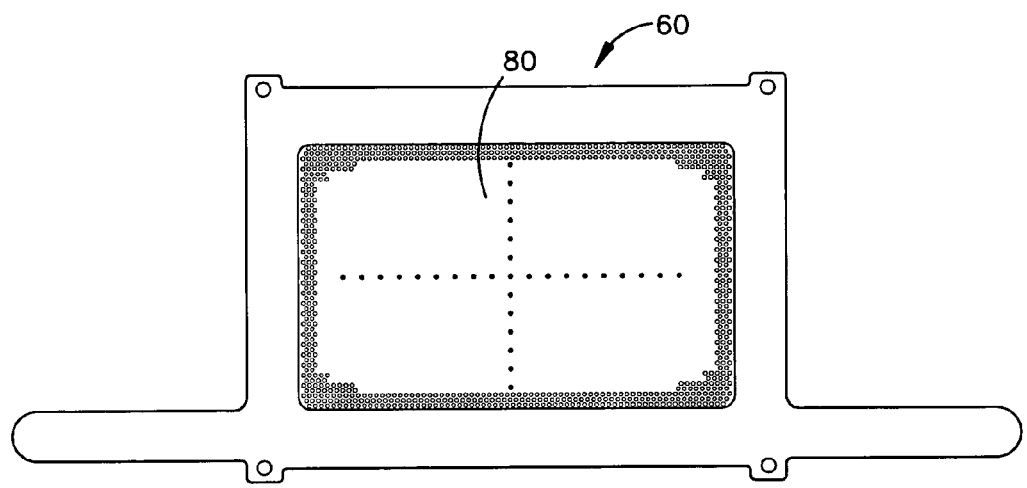
FIG. 11 is a schematic, top plan view of a fluid fuel embodiment of the photolithographic foil member of the ceramic composite cell of the device of the present application.
Figure 23:
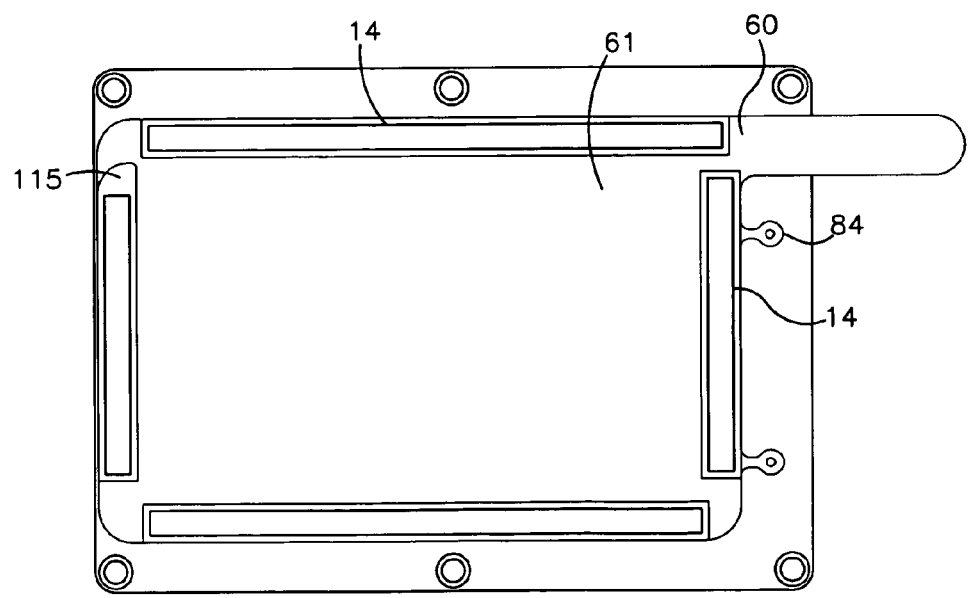
FIGS. 23-23C are graphs illustrating cell operating performance.

In the embodiment of FIG. 13, the cell 12, and each of its component parts, has a substantially square configuration forming a body 12a, a single arm 12b extending therefrom, and with a metal perimeter 12c surrounding the body. In the embodiment of FIG. 8, the cell 12 has a substantially rectangular configuration, and includes two arms 12b and 12d. Each of the cell components includes the elements of a body 12a, an arm 12b, possibly 12d, and a perimeter 12c, which elements will all be referred to using these designations. The arm 12b in the FIG. 8 embodiment provides a fluid fuel input 21. The arm 12d in the FIG. 8 embodiment, and a portion of the arm 12b of the FIG. 13 fluid fuel embodiment, forms a gas output plenum or passageway 22. In this embodiment, fuel input and output tubes may also be used to interconnect with the arms 12b, 12d to interconnect with the fuel supply 20 and exhaust outlet.

As shown in FIG. 13, a foil patch 51 is provided intermediate the photolithographic member 60' and the bipolar foil member 50'. As shown in FIG. 14, the patch 51 enables the single arm 12b to function as both the fuel input 21 and fuel output 22. An alternate configuration of a similar arrangement to that of FIG. 13 is illustrated in FIG. 14A. In this embodiment, the photolithographic member 60' is not embossed, but the foil patch 51' and the bipolar foil member 50' are embossed in a loosely nesting arrangement as illustrated. This embodiment would be preferred for applications where no embossment of the photolithographic member 50' is desired.

Figure 15:
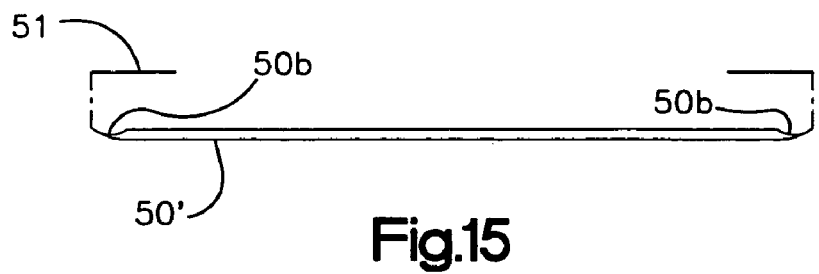
FIG. 15 is a cut-away, cross-sectional view of the photolithographic foil member taken along the line 15-15 in FIG. 12.
Figure 16:
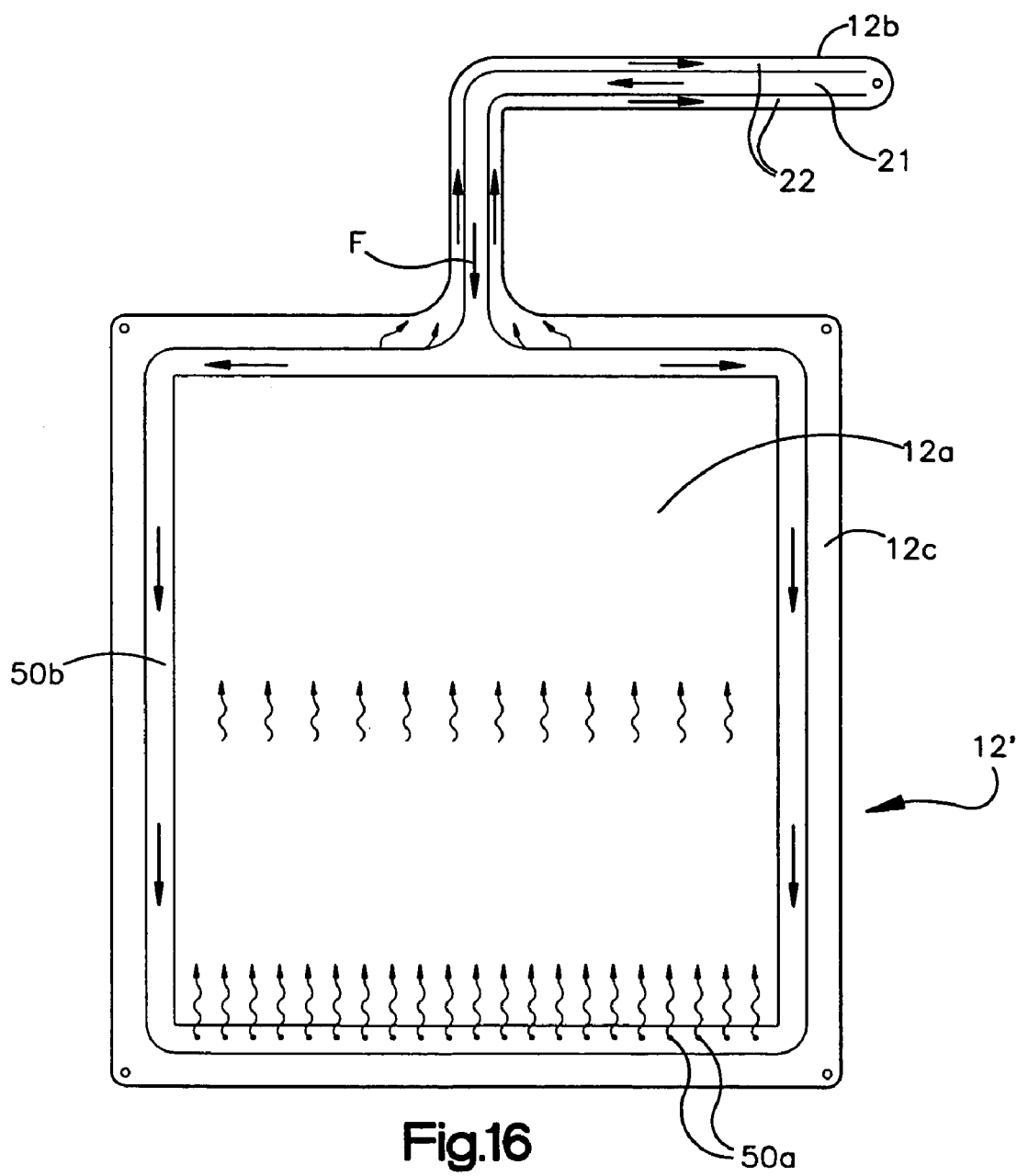
FIG. 16 is a schematic diagram showing the fuel circuit of a fluid fuel embodiment of the device of the present application.
Figure 18:
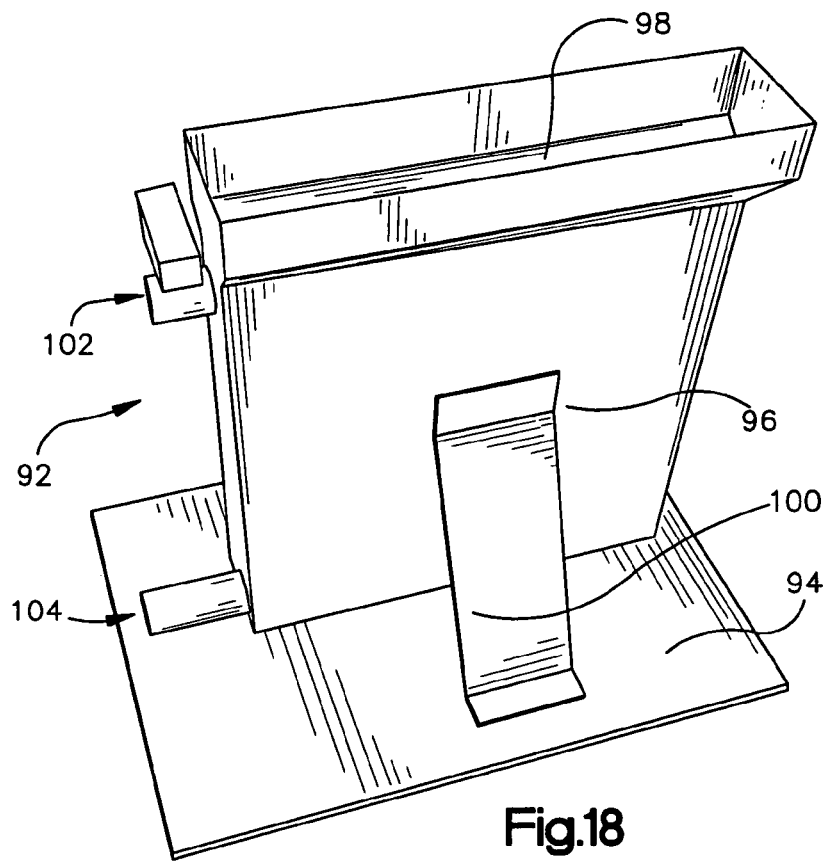
FIG. 18 is a perspective view of the dip tank of the dipping system used to contain the ceramic slip materials for the ceramic composite cell.
Figure 19:
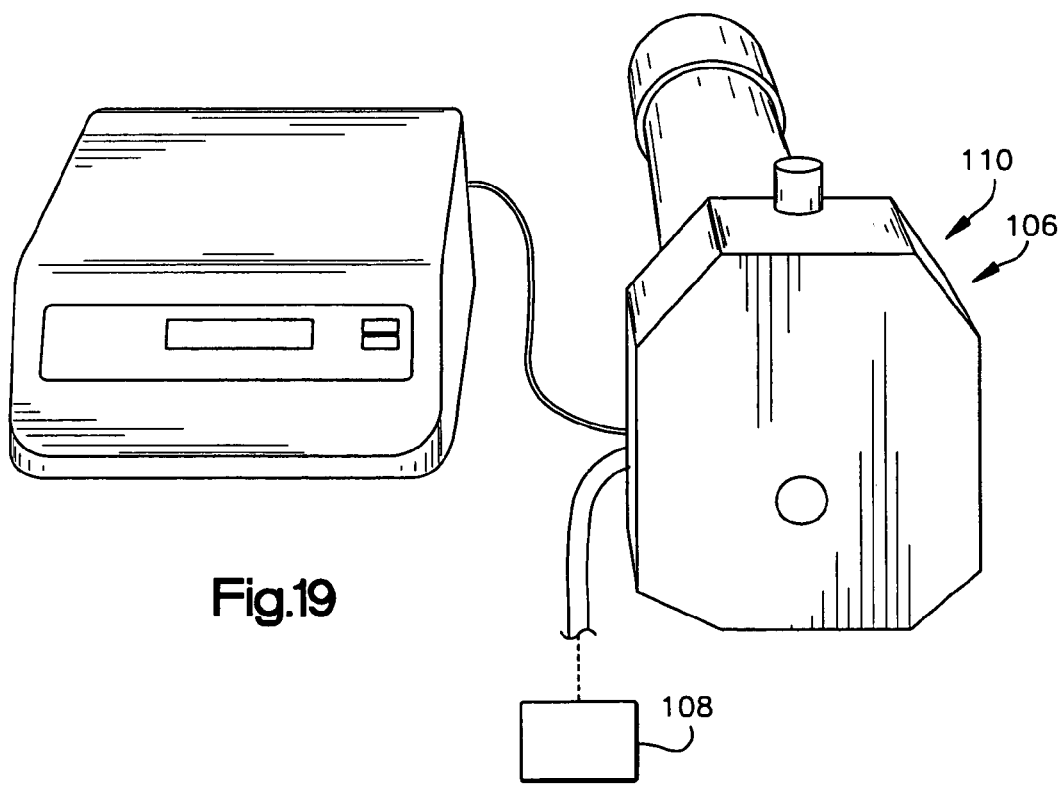
FIG. 19 is a perspective view of the computer controlled pump of the dipping system used to contain the ceramic slip materials for the ceramic composite cell.

In this FIG. 13 arrangement, the bipolar foil member 50' is of 0.002 inch Inconel steel, and is embossed 0.055 inches deep, as shown in FIG. 15 at 50b, using a ¼" diameter rod. This embossed area begins in the arm 12b, and splits to extend to the body 12a, forming a loop. As shown in FIG. 16, 22 small holes 50a holes having $\frac{1}{32}$ inch diameters and spaced ¼", are formed at the edge of the member 50' opposite the arm 12b. The foil patch 51, approximately 0.002" thick also of Inconel steel, is then used to cover the embossed area. The foil patch 51 seals the incoming fuel from escaping or mixing with the outgoing exhaust fuel. The patch is then hermetically welded to the bipolar foil member 60' to form the complete gas circuit illustrated by the arrows in FIG. 16. In this embodiment, fuel flows into the embossment 60b formed intermediate the bipolar member 50' and the foil. At the split, the fuel flows to either side of the cell at ½ the rate of the original flow rate. The fuel is preheated as it travels along the cell, and then enters the active area of the ceramic composite cell via the holes 50a, or controlled stitch weld, since photolithographic member 60' supporting the desired ceramic material is also welded to the bipolar foil 50'. The fuel flows through the cell reaction illustrated in FIG. 2 with the ceramic to provide electric power. As the fuel is used up, exhaust gases (which are heating the incoming fuel) exit the cell adjacent the split, and exit the cell through the arm 12b and outlet 22 as indicated by the arrows in FIG. 16. In this design the end of the arm extends past the edge of the cell to provide additional cooling.

In the fluid fuel cell example of FIG. 3, fuel is supplied to the cell via fuel input 21, and gas exhaust exits the cell via output 22, as best shown in FIG. 3A.

It should be noted that in the event a solid fuel design is desired making use of the cell configuration of FIG. 13, the cell is again simply formed without the use of the patch 51, such that the arm 12b then functions only as a fuel exhaust output 22, since no input is required.

In the solid fuel embodiment of FIG. 5, no fuel input or output arms are required. The input arm is not required as the solid fuel is provided within each of the cells as illustrated. However, a fuel exhaust is required, but instead of an arm, the output 22 is formed as a break in the weld W, so that exhaust gases are permitted to escape or exit during operation. Each of the cell components are welded together along the perimeter 12c at the locations indicated W, preferably using a $CO_2$ laser.

The cells 12 are preferably manufactured as set forth below.

The Bipolar Foil of the Cell

The bipolar foil 50 is cut from any metal foil which is temperature, corrosion and oxidation resistant may be used, such as Fe based, Ni based, austentic, martensitic, ferritic and duplex, stainless steels, silver, silver alloys, superalloys and high nickel alloys. Inconel steel is used in the present embodiment, as previously described. A $CO_2$ laser is also used to cut the foil to the size and various configurations illustrated. In operation, one side of the bipolar foil communicates with ambient air, the air side A, and the other side communicates with fuel, the fuel side F. Using a cold-forging or embossing process, the foil 50 is then embossed in two directions, with the large dimples in one direction, and the small dimples in the other direction, to form the dimple pattern 52 illustrated using a 60,000 pound hydraulic press. The foil 50 is pressed inside a two part die. Aligning pegs are used to ensure accurate placement of the resulting large and small dimples 64, 66 in the foil 50 during pressing. The die is pressed four times at 10,000 pounds in the corners of the foil to obtain the dimple pattern 52. It should be understood that any raised pattern or configuration which allows for gas passage and electrical contact may be embossed on the bipolar foil 50.

Figure 27:
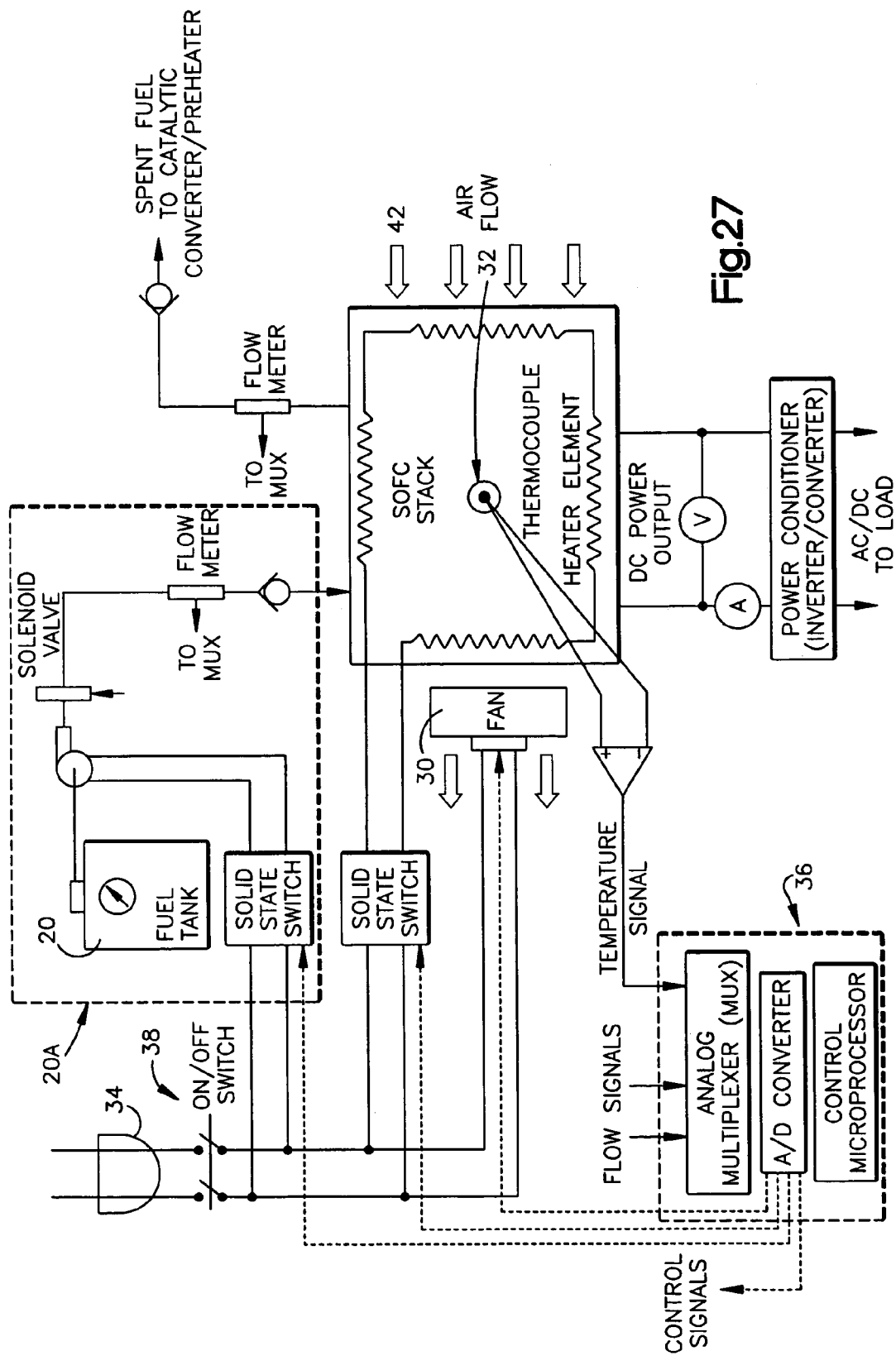
FIG. 27 is a partial, schematic representation or block diagram illustrating the power controls and circuitry of the device of the present application.

In the illustrated embodiment, the air side, or cathode side, of the foil is embossed with $1/8$ inch ball bearings to create the large dimples 64 which are raised approximately 0.026 inches out of the foil. The fuel side, or anode side, of the foil is embossed with $3/32$ inch ball bearings to create the small dimples 66 which are raised 0.014 inches out of the foil. All of the dimples with the same size diameters are spaced with approximately 0.354 inches between their centers. Using the dimple pattern 52 of embossments, as is illustrated and will be further discussed, the anode 18 of one cell 12 is electrically connected directly to the cathode 16 of the adjacent cell 12. For an enhanced capacity to carry stress, the dimples may be configured closer together, or in top of one another. Once the cells are stacked and interconnected in the cell stack 13, they are interconnected as schematically illustrated in FIG. 27.

This arrangement results in the linear accumulation of voltage at constant amperage as the number of cells increases. It also minimizes the material required, and minimizes possible power loss.

The mechanical and electrical functions of the bipolar foil are to provide a backing for the photolithographic member 60 by enabling collection of fuel within the cell and a hermetic gas passageway 22 to direct the exhaust fuel and gas generated on the anode side of the foil, to transmit electrical current to the next cell, to provide spacing on the fuel and air sides of the foil for gas flows and to evenly distribute the temperature and current flow through the cells. Preferably, the bipolar metal member has contact portions extending outwardly in two directions from a plane of the bipolar metal member for engagement with said ceramic composite member.

In FIGS. 13, 14, and 16, as previously mentioned, the fuel input or inlet 21 is embossed, using the hydraulic press technique mentioned, in the bipolar foil within the arm 12b portion of the foil to enable the flow of fluid fuel to the cells 12. It is further noted that the cell embodiments illustrated may or need not include an individual cell heat element 62 within, surrounding or adjacent to each cell 12.

Once the bipolar foil 50 includes the two-directional dimple pattern 52, an electrical contact layer 112 is provided on the tops of both the large and small dimples 64, 66. In the present embodiment, the electrical contact layer 112 is two layers, where each layer is double coated, of silver, alloyed with a small amount of another metal such as gold, platinum, palladium or iridium. The preferred embodiment includes a small amount of gold ink which is mixed with silver ink and stamped on the dimples using a stamp pad is coated with the mixture to obtain a thickness of $1/16$ inch. However, such material may be applied by plating, painting or any other available coating technique. The commercially available silver and gold inks used are 24% Gold Resinate Solution with 19.4% Metallo Organic Silver Ink, both available from Englehard. The inks are mixed together in a 1 to 1 ratio, although other proportions are possible depending on the alloy of the bipolar foil member, the desired service temperature, and the amperage.

Following application of a first layer of ink, the bipolar foil is fired to 200° C. for $1/2$ hour, and allowed to cool. Once cooled, the bipolar foil is fired to 650° C. at 5° C. per minute for 60 minutes, and allowed to cool. A second coat of ink is then applied and fired as described. The bipolar foil is then refired to 650° C. at 5° C. per minute for 60 minutes. A second layer of Silver Fritless ink available from Englehard is then used to cover the dimples on one side of the bipolar foil. Following such application, which is by painting, the foil is placed in the furnace and fired to 200° C. for $1/2$ hour, and allowed to cool. Once cooled, the dimples on the opposite side of the foil are then painted and heated as described. Once the dimples on both sides of the foil are coated, the bipolar foil is fired to 650° C. at 5° C. per minute for 60 minutes, and allowed to cool. A second coating of ink layer is then added and fired using the process just described. Such inks provide intimate contact with the surface of the bipolar foil 50.

Alternatively, multiple layer electrical contacts may also be used. In one example, the first layer is a very thin catalytic and/or particularly noble and unreactive metal, such as platinum or a platinum rich alloy. The second layer is preferably silver and of approximately 300 μinches, or other metals which are electronically and thermally conductive. An outer layer of approximately 15 μinches of gold is also provided. Such a combination alloys well, and sinters to a substantially gas tight metal phase when heated. It is noted that in the event a plating technique is used, which may extend to the metal perimeter 12c, outside the area of the dimple pattern 52, a masking technique is also preferably employed to avoid interference of the electrical contact layer with welding or other mechanical connections formed between the cell components. Such masking may be accomplished using a conventional type chromate paint such as Super XP2000 Laquer available from Micro Products.

The Frame and Cell Heat Element

The frame 54 of the cell 12, both the first and second members 56, 58, is preferably cut from an alumina forming alloy, for example, Alpha IV steel foil available from Allegheny-Ludlum. It should be understood that any metal foil which is temperature and oxidation resistant may be used, such as stainless steels, Fe based alloys, Ni based alloys, austentic, martensitic, ferritic and duplex, silver, silver alloys, superalloys and high nickel alloys. The foil has a thickness of approximately 0.008 inches. Several different overall cell configurations are currently used, as previously mentioned. In the illustrated embodiments the cell 12 has a rectangular or square configuration. The first and second frame members 56, 58, illustrated in FIG. 8 are substantially opposite or reverse image in their configuration, but for an optional bridge portion, such that upon assembly they together form the supporting structure engaging the other components of the cell. In the event the photolithographic foil member is embossed with a portion for receiving an individual heat element, no additional frame members may be required. The members 56, 58 include alignment holes 68 at least at three of the frame corners for use in aligning the components of the cell, and securing the cells 12 in the stacked configuration of the cell stack 13 within the thermal shell 24. By embossing either the bipolar foil member, the photolithographic foil member or the frame member, additional stiffness is added to the structure of the cell, without adding additional weight. Also, the embossment lessens any warping which may occur during welding. The arms 12b of the cell heat element extend from the body portion as indicated in FIG. 16.

The arm 12b extends from the body 12a of the cell 12 as illustrated. However, it should be understood that the arm may extend from the side, or at another convenient location for obtaining the desired design cell characteristics. Each of the first and second frame members 56, 58 includes a cut out portion 74.

Prior to use of the frame members, these members are cleaned and optionally fired to provide an alumina containing surface which tends to provide an electrically insulating coating and for material stress relief, since the material is more ductile following firing. In the FIG. 12 embodiment, the cell heat element is a 0.008 inch thick Alpha IV foil member, having a width of 0.400 inches. Each frame member and optional cell heat elements are cleaned with ethanol or other appropriate cleaner. In the preferred embodiment, the frames are then arranged in the following repeating configuration: a setter plate, two same direction frames, and a layer of zirconia felt outlining any embossment. The frames and cell heat elements are then heated in a furnace as follows: increase 5° C. per minute up to 500° C., then up 3° C. per minute up to 900° C., then hold for 15 hours, then down 3° C. per minute to 500° C., then off.

Additional cell heat elements may also be used in connection with the present device. For example, a conventional heating wire may be used which is sheathed in woven or braided ceramic electrical insulation material. Still further, a thick film paste material system for planar heater applications of the type available from Ferro Corporation, Cleveland, Ohio, may also be used within the first and second frame members 56, 58 as a heat element 14, or directly on the bipolar foil and/or photolithographic member.

In a still further embodiment of the present device, as illustrated in FIGS. 17-17B, a heat element 14 is provided. The specific element 62 includes two bipolar foil members 50, not used in connection with a complete composite cell 12. Sandwiched intermediate the members 50 is a heater strip of conventional resistive wire 62' such as Kanthal alloy AF, which is covered by quartz tubing 190, as shown in FIG. 17B. The tubing 190 is covered with a woven or braided glass or ceramic cloth sheathing 191. Once the components of the heat element 62 are constructed with the bipolar members, wire 62' quartz tubing and sheathing 191, they may be placed intermediate completed cells 12 within the cell stack 13 at intervals of approximately every 3-20 cells 12, and on the top and bottom of the stack 13, is desired. The wire 62' is conventionally connected with a power source 34 to heat the cell stack 13, both at startup and during operation. This heat element embodiment has the advantage of providing direct solid to solid heating of the ceramic, which results in quicker heating with less wasted energy.

The Photolithographic Foil Member of the Cell

The photolithographic foil member 60 is preferably manufactured of an alumina forming alloy such as Alpha IV or Haynes International's H-214 alloy, but may be another suitable high temperature, corrosion and oxidation resistant, metal alloys, such as stainless steels, Fe based alloys, Ni based alloys, austentic, martensitic, ferritic and duplex, silver, silver alloys, superalloys and high nickel alloys. The foil member 60 is preferably between approximately 0.001 to 0.008 inches thick. As illustrated in FIGS. 12 and 12A, a honeycomb hole pattern, or hexagonal close packed hole pattern section 80 or the "active area" of the member, is preferably provided within the member 60. The use of the honeycomb hole pattern 80, which has no sharp corners, and is rounded at the corners, avoids stress concentrations in the metal member 60, which may later result in cracking of the ceramic composite material 61 which is the combination of the ceramic material CM within the pattern 80 of the member 60. It should be understood that alternate hole and hole pattern configurations may be used, such as the use of ovals, or bars with rounded ends. However, such designs should avoid the use of sharp corners to reduce stress.

The size of the hole pattern section 80 results in a metal perimeter 12c which allows for sufficient mechanical deflection of the member 60 without resulting in stressing of the ceramic material which is eventually provided within the holes of the hole pattern section 80. Best results from the device 10 of the present invention are believed obtained when small, close packed holes are used, to provide good electrolytic characteristics within the cell, together with thin but strong and supportive interconnections between the holes, to give the cell good mechanical properties. Additionally, welding and additional interface requirements related to the member 60 may be performed at the metal perimeter 12c.

The hole pattern in the hole pattern section 80 is created within the metal member 60 using conventional metal photo lithographic techniques, or photo chemical etching. At the center of the pattern, a hole size and arrangement is provided as illustrated, which is approximately 0.0375 inches between the centers of the holes along the long side of the member, and approximately 0.0325 inches between the centers of the holes along the short side of the member. The large hole size is approximately 0.033 inches in diameter. At the edges of the hole pattern, the sizes of the holes may be reduced, or feathered from large to small. The first size reduction is to approximately 0.025 inches diameter, and the smallest sized hole is approximately 0.016 inches diameter. Alternate feathered patterns may also be used. An exhaust fuel arm 82, comparable to the arms 12b provided in the other cell components, is provided on the member 60. Still further, tabs 84 may be provided along one side of the photolithographic member 60 for suspending the member into a tank containing the desired ceramic material to be applied to the member, or dipping the member. Following the dipping process, the tabs 84 are removed by conventional cutting techniques.

The embodiment of the photolithographic foil member 60' illustrated in FIG. 16, includes an embossment 73 which is spaced from and surrounding the hole pattern section or active area 80. The embossment 73 in FIG. 13 is arranged to provide fuel input or fuel exhaust, depending on the design as previously discussed. It should be understood that, depending on the design selected, the cell 12 need not include either a frame or a heat element for engagement with the photolithographic member 60. Although they may be useful, where it is desired to minimize weight considerations, designs eliminating these components are desirable.

Each of the frame, bipolar foil and photolithographic members 54, 50 and 60 additionally include alignment holes 68 for alignment of the members during further assembly of the cells 12.

Once the photolithographic member 60 is cleaned by detergent washing and rinsing, followed by isopropanol washing and drying, the member is masked to prevent coating of certain sections of the member with the desired ceramic material. Any masking material desired may be used. In one embodiment, a polyimide tape 125 with silicone adhesive is used. However, it should be understood that alternate tapes, such as Scotch® brand Magic tape may also be used. In the event such commercially available tapes are used, it is preferred to additionally include a further layer of refractory ceramic coating 126, such as 20% solids zirconia, alumina or mullite, containing a small amount of polymer. The polymer used is a solution preferably containing nitrocellulose or "guncotton," of the type commercially available in fingernail hardener and thickeners. This layer of tape 125 and refractory ceramic coating including the polymer 126 keeps the coatings applied to the member 60 during dipping from contacting the metal perimeter 12c. Additionally, if 0.002 inch photolithographic foil member is used, a metal support or splint can be taped to the metal perimeter 12c to provide additional mechanical integrity during the dipping process.

Where polymer or "Scotch" brand tapes are used, they burn off in-situ during firing. Polyimide, silicone or aluminized tapes are preferably peeled off prior to high temperature firing.

Application of the Ceramic Material

The ceramic material interconnected with and supported by the hole pattern 80 of the photolithographic member 60 is as follows: a first base coat is of 8 mole percent yttria-92 percent zirconia. The fully stabilized zirconia powder is from TOSOH Corporation, grade TZ-8Y or TZ-8YS, and is fired at high temperature 1400° C. to 1500° C. for 1 to 3 hours in alumina boats and sieved through a 140 mesh screen (U.S. standard). The mesh tailings passing through the 140 mesh are used as the starting powder for base coat material. The base coat or slip material is prepared by comminuting the zirconia powder with a suitable solvent and dispersant using an attritor mill (Union Process Model 01-HD). This process yields a ceramic slurry consisting of zirconia powder suspended in an organic solvent.

The slip is prepared in a series of steps:

First, 1800 g of 5 mm diameter TZ-8Y grinding media is placed in the attritor jar. The jar is placed on the mill and is attached to an agitator and water jacket with a water tank set at 80° F. Next, 45.2 g of hexanol, 45.2 g of hexadecane and 1.5 g of WITFLOW-910 dispersant from Witco, Corp., is added to the jar. The attritor mill is then set to 175 rpm. Over the next 5 hours a total of 1200 g of TZ-8Y powder is added to the mill as follows: 300 g at start up; mill for 1 hour and add 300 g; mill for 1 hour and add 150 g; mill for 1 hour and add 150 g; mill for 1 hour and add 150 g; and mill for 1 hour and add 150 g. After powder addition, continue milling for another 28 hours. It should be understood that alternate milling schedules, such as 24 hours at 240 rpm, which result in similar particle size may also be used.

Once the mill is stopped, pour the slip and grinding media into a polypropylene jar. Add the following: 10.5 g of WITFLOW-910 dispersant; add 2.7 g of hexadecane; and add 24 g of polymer solution.

The polymer solution provides green strength to the base coat to prevent cracking prior to firing. It burns off in-situ during high-temperature firings. The polymer solution is prepared separately as follows: 450 g of poly(2-ethylhexyl methacrylate (from Aldrich Chemical Company, Inc., #18, 207-9; a ⅓ by weight solution of polymer in toluene) is added to a 1000 ml beaker with 75 g of 1-phenylnonane (Aldrich #33, 106-6). Mix well and heat in drying oven until toluene has been driven off and the remaining solution is ⅔ by weight polymer in 1-phenylnonane.

After the above additions, place the jar on a ball mill and mix for at least 6 hours. Following mixing, the slip is ready for application and is composed of 92.8 percent by weight solids TZ-8Y in total slip, 1 percent by weight solids dispersant, and 2 percent by weight solids polymer solution.

The slips are applied by dipping of the photolithographic member 60 into the slurry mixture. After dipping into the first base coat, the coated member 60 is allowed to stand in air for at least 1 hour. This allows removal of some of the solvent from the coating through evaporation. When the coating is completely air dried, the composite is suspended inside a force-convection oven and further dried by heating slowly to 95° C. for 30 minutes. The composite is then cooled to room temperature.

At this stage the polymide film, if used, is peeled off to expose the bare, uncoated metallic areas.

The composite is then fired at high temperature to cause sintering and densification of the ceramic coating, and to increase its adhesion to the metal substrate. For firing, the fried composite is sandwiched between two layers of zirconia felt (type ZYF-100, from Zircar Products, Inc., Florida, NY) and porous alumina setter plates, such as 10 ppi grade from Selee Corp., Hendersonville, N.C.

The choice of setter plate is very important, since it must be double-ground, flat and co-planar on both sides to prevent distortion of the membrane. It should have an acceptable porosity to allow adequate oxygen access during sintering. The size of the setter plates should be slightly larger than that of the composite to be fired. The zirconia felt is cut into sheets the size of the setter plate. One sheet of felt is placed on a setter plate. The dried composite is placed flat on this felt sheet. The second felt sheet is placed over the composite and the second setter is placed on top of this felt sheet. Several composites can be fired simultaneously by repeating this sandwich configuration to form a stack.

The sandwich configuration containing the dried composites is placed on the hearth of a high-temperature sintering furnace. The following firing is used for the base coat: heat from room temperature to 1000° C. at 5° C. per minute for 2 hours; heat from 1000° C. to 1100° C. at 1° C. per minute for 2 hours, and heat from 1100° C. to 1200° C. at 1° C. per minute for 5 minutes. Allow the furnace to cool to room temperature. The surface of the fired composite is then cleaned with compressed air to remove residual ceramic fibers arising from contact with the felt. It is inspected visually for flatness, ceramic-to-metal adhesion and macroscopic flaws such as voids, tears, etc. it is also inspected with an optical microscope to ensure freedom from microscopic defects such as pin-holes and micro-cracks.

The completed base coat usually contains some residual porosity and must be further sealed to obtain dense, gas-tight membranes that can be used in the electrochemical device 10. Sealing is accomplished by the use of a stabilized zirconia seal slip coat and a ceria-gadolinia-zirconia seal slip coat.

The seal slip is prepared with 8 mole percent zirconia powder (TZ-8Yb). The powder is dried in an oven at 150° C. for 1 hour. The slip is prepared by comminuting the powder with a suitable solvent and dispersant using the attritor mill. The attritor jar is placed on the mill attached to the agitator and water jacket hooked to the water tank set at 80° F. 1000 g of 5 mm diameter TZ-8Y grinding media are placed in the jar. 257 g of hexanol solvent and 3 g of SANDOPAN MA-18 dispersant (Clariant Corp. Charlotte, N.C.) are also placed in the jar. The mill is turned on to idle. Then 600 g of dried TZ-8Yb powder is added to the mill in three batches of 200 g each. After the addition of each batch, the powder is given a few minutes to blend.

After the powder is added, the mill speed is increased to 500 rpm. Continue milling for 72 hours. At the end, stop the mill and pour the slip and grinding media into a polypropylene jar. This slip forms the stock seal coat material and contains 70 percent by weight solids and 0.5 percent by weight solids dispersant. The stock seal coat material is refrigerated to prevent aging.

The seal slip is prepared by diluting the stock seal coat material from the 70 percent solids to the 30-45 percent solids range. Dilution is done by adding a solvent mixture of hexanol and ethanol. The final solids level and the hexanol/ethanol ratio in the mixture are determined by the size and geometry of the composite to be sealed. After dilution, polymer solution (1 percent by weight of total solids in the slip) are added. The slip is allowed to mix on the ball mill for 3 hours.

The seal slip is poured in the dip tank. Prior to dipping the bare metal areas of the composite are masked off again as described previously. The composite is carefully immersed in the slip to a depth that covers the entire base coat area. The composite is allowed to reside in the slip for 2-3 minutes until bubbling subsides. The coated composite is carefully withdrawn from the dip tank. Clips or hooks are attached to the composite and it is hanged on a rack for draining and air drying. After use the diluted slip is also refrigerated.

The seal coat is oven-dried in the same manner as the base coat. After drying, the composite is sandwiched between zirconia felt and alumina setter plates for firing. The following profile is used: heat from room temperature to 1000° C. at 5° C. per minute for 1 minute; heat from 1000° C. to 1025° C. at 1° C. per minute for 4 hours; and allow the furnace to cool to room temperature.

The surface of the seal-coated composite is then cleaned with compressed air to remove residual ceramic fiber arising from contact with the felt. The composite is then dipped in diluted seal slip for second time, dried and fired as described above. The second seal dip and firing ensures uniform coverage of the base coat with a thin zirconia layer. A third seal dip may also be necessary.

The base and seal coats are then sealed with two or more layers of aqueous seal slip solution containing cerium, gadolinium and zirconium nitrates. This solution has two advantages: it penetrates and seals any residual micro-porosity in the underlying seal slip layers, and after firing it yields a highly active surface of ceria-gadolinia-zirconia suitable for electrochemical reactions.

The solution is prepared as follows: 335 g of distilled water is added to a glass beaker, 3 drops of glacial acetic acid is added. The beaker is placed on a hot plate with a magnetic stirrer. 100 g of zirconyl nitrate is added. The solution is warmed and stirred until the zirconyl nitrate dissolves completely. Add 487 g of cerium (III) nitrate. Add 180 g of gadolinium nitrate. Continue stirring until all solids are dissolved, cool and store solution in a sealed polypropylene jar until further use.

The solution is poured into the dip tank. Prior to dipping the bare metal areas of the composite are masked off as previously described. The composite is carefully immersed in the solution to a depth that covers the entire composite. The composite is allowed to reside in the solution for 2-3 minutes. The coated composite is carefully withdrawn from the seal solution. After excess solution has drained off, the coated composite is placed on a bare setter plate and introduced to a furnace at 90° C. The following firing profile is used: dry at 90° C. for 1 hour, heat from 90° C. to 850° C. at 2° C. per minute for 2 hours, allow the furnace to cool to room temperature.

After firing the composite is dipped and fired with the solution for a second time, and the process is repeated until sealing is achieved.

Figure 29:
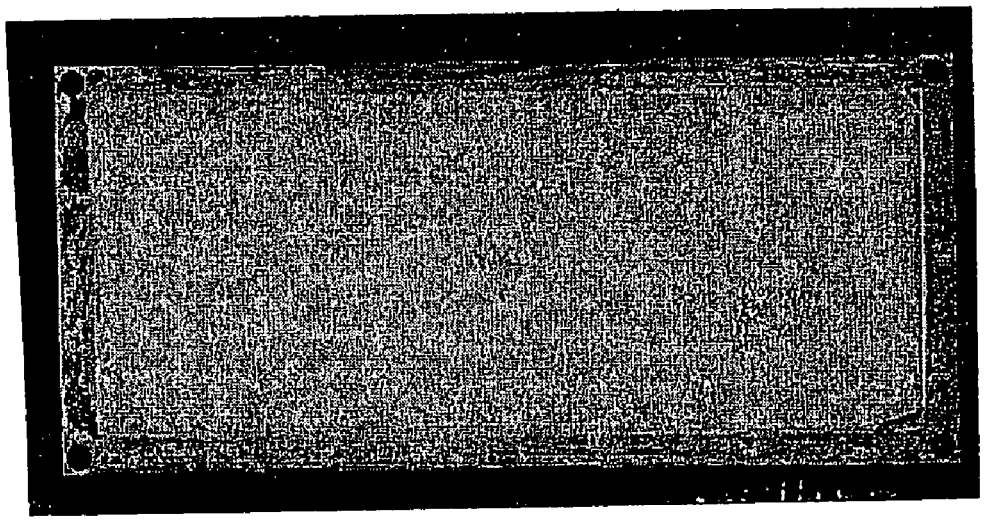
FIG. 29 is the ceramic composite cell sample of FIG. 28 on the other side of the cell, showing that no test dye has penetrated the cell.
Figure 28:
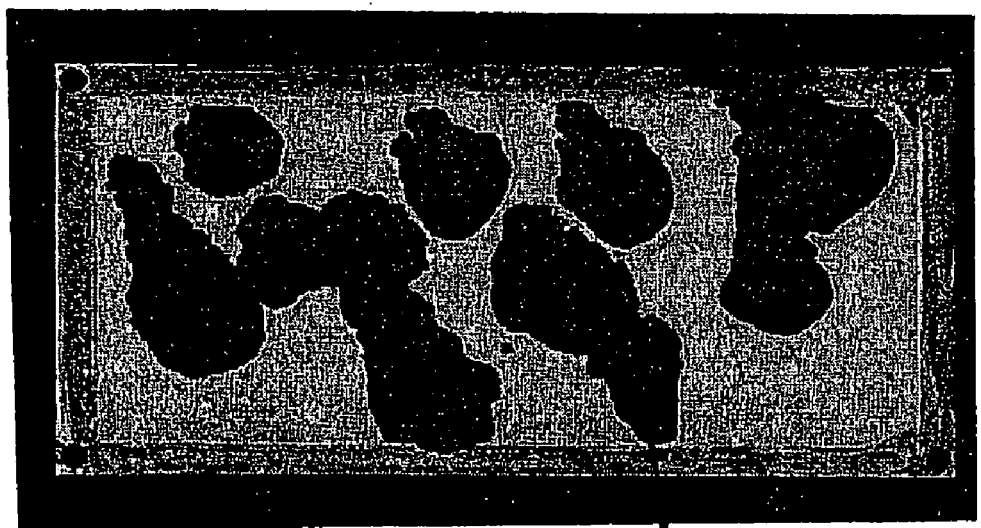
FIG. 28 is a sample of a ceramic composite cell showing the test dye on one side of the cell.

The complete composite is tested with a solution of eosin dye D in isopropanol for sealing. The dye solution D is applied on one surface of the membrane as in FIG. 28, and the other side is examined for dye penetration, leakage and coloring. A good quality membrane shows no dye leakage on the other side of the membrane as in FIG. 29. Minor leakage may be corrected by burning out the dye at 400° C. and applying additional layers of nitrated seal solution followed by firing.

The Dipping Process and the Dip System

By applying the base and seal coat slurries using a dipping process, a better and structurally stronger ceramic composite material is believed obtained. Additionally, the resulting product is easier to reliably manufacture. Although spraying, spinning, silk screening and painting techniques may all be used in the application of the slurries, the dip process is believed to provide more dense packing of the slurry particles, enabling more efficient ionic flow through the cell. Failure of the coatings to adhere also appears to be minimized using the dipping process. The dip process makes use of a dip system having a tank with an optionally circulating slurry or slip material so that the material is constantly agitated and does not have an opportunity to separate.

Figures 20, 21:
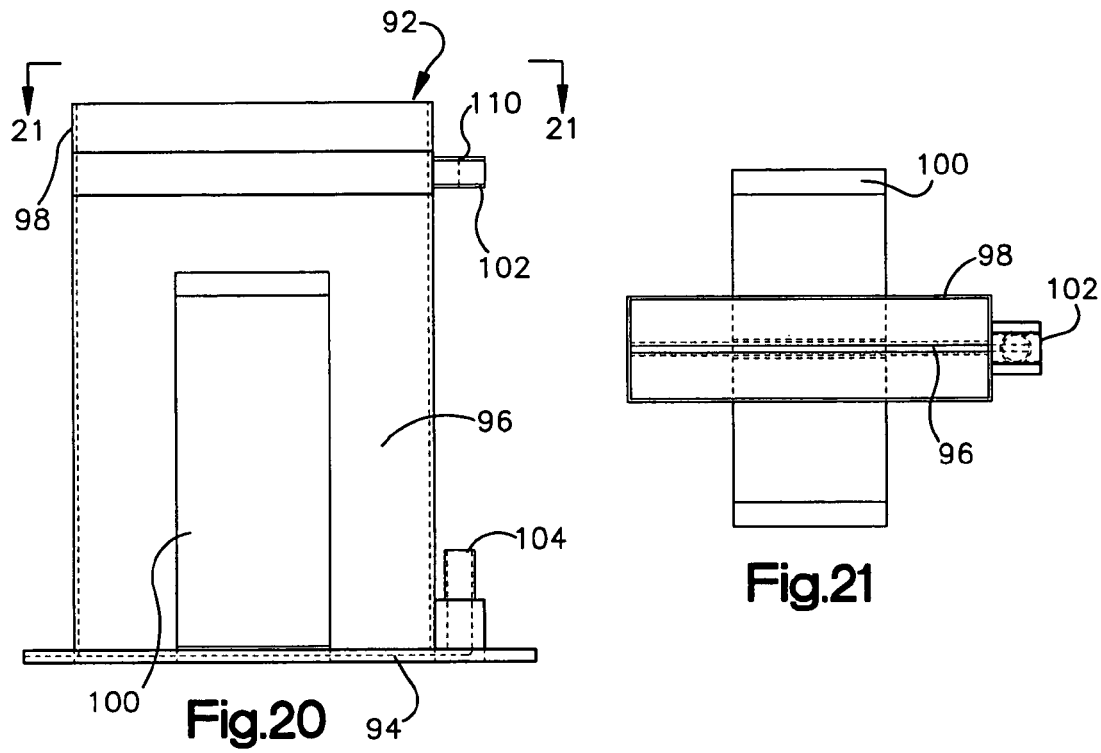
FIG. 20 is a schematic, side view of the dip tank of FIG. 18.
FIG. 21 is a partial, top plan view of the dip tank taken along the line 21-21 of FIG. 20.
Figure 22:
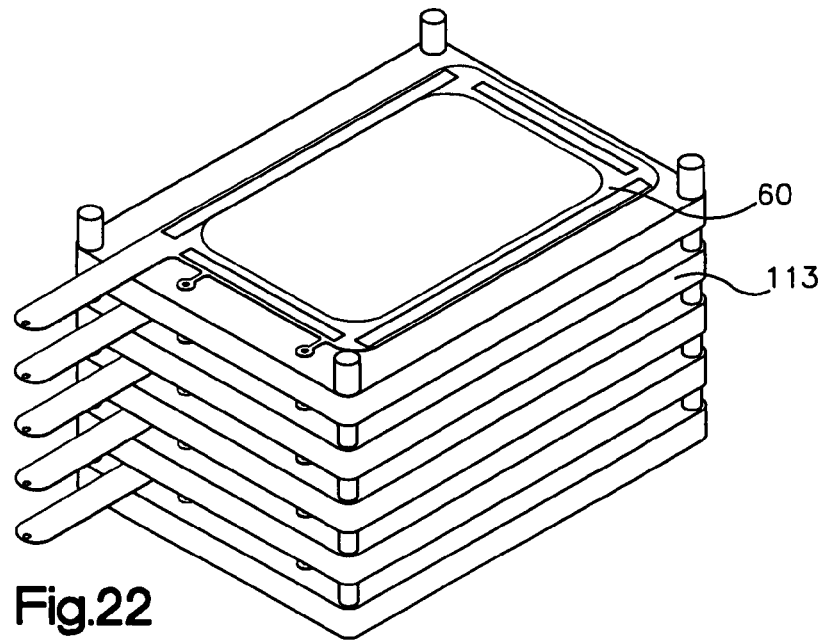
FIG. 22 is a perspective view of alternate configurations of photolithographic foil members arranged for firing following the application of a coating of ceramic material.

The dipping process of the present invention is now described. The cleaned photolithographic members 60 are dipped into a dip tank 92 of the type illustrated in FIG. 21 suspended from the tabs 84. The dip tank 92 is a container approximately 11 inches tall, 7 inches long and ¼ inch wide. The tank may be manufactured of any appropriate metal, but preferably of a polymer material, such as polypropylene. The use of the polymer materials prevents the addition of metals or metal oxides to the base and seal materials. The tank includes a base plate 94, a reservoir portion 96, a drip portion 98, and supports 100 interconnecting the base plate 94 and reservoir portion 96.

The dip material may be poured into the tank, or as an option, an inlet 102 and outlet 104 are also provided for continuously supplying slurry material to the tank. The inlet and outlet 102, 104 are interconnected via Viton hose with a peristaltic pump 106. The pump 106 has a microprocessor controller 107, is manufactured by Cole Parmer, and is able to pump quite coarse slurry materials. The pump is in communication with a slurry supply tank 108 and material filters 110 forming a part of the pump 106 and the inlet 102, which supply the desired amount of filtered slurry to the tank.

The tank is first filled with slip or slurry material, at least to the inlet 102, and a flow of material is started between the inlet 102 and outlet 104 using the pump 106. The member 60 is then submersed within the reservoir portion 96 via the drip portion 98. Once submersed the direction of the slurry flow may be reversed using the pump controller. Such flow changes enhance the coating of the member 60. Additionally, once the member 60 is coated, the flow direction may be reversed in order to remove any bubbles which may have formed. When the member 60 is removed, care should be given not to bump the sides of the tank. The coated members 60 are then hung via conventional hangers from the tabs 84 on a drying rack.

Application of Electrocatalyst Layers

Following the application of the base and seal coats and solution, an electrocatalyst layer is applied to the surface of the ceramic material. This layer is preferably added to those embodiments using heavier hydrocarbon fuel, such as octane, which are more prone to coking than lighter fuels, such as methane. The coking of the fuel precipitates carbon solids and can potentially occlude the anode, and the fuel inlet and outlet passages. The efficiency of the cell is related to the performance of the electrocatalyst, which has two functions: to reduce the overpotential and thus allow for lower temperature operation, and to allow for the relatively rapid direct electrochemical oxidation of the fuel. The electrocatalyst is preferably applied, such as by spraying, painting, or dipping (using appropriate masking, such as to the perimeter) to one or both sides of the ceramic material of the cell, depending on the results desired. In the illustrated embodiment of FIG. 16A, the electrocatalyst 122 is the dark substance shown on the surface of the ceramic material within the cell body 12a. A view of the opposite side of the same cell in FIG. 16B, is not provided with electrocatalyst. The electrocatalyst is applied to allow for the direct conversion of fuels into electricity, since the fuel cell stack 13 does not generally require other fuel treatment equipment, thus reducing weight and volume requirements for the system.

In the example illustrated in FIG. 3A, which is a cut-away version of the cell 12 of FIG. 3 with the ceramic composite material removed, a fuel input 21 supplies fluid fuel to the ceramic composite material 61 along the repeating S-shaped pattern illustrated. The darker portions C adjacent the input 21 and outlet 22 are coke deposits. The lighter region indicated generally by the electrocatalyst layer 122, displays no coking.

The layer of electrocatalyst is preferably a high surface area mixture of solid electrolyte particles and transition metal oxide particles, such as ruthenium oxide and iridium oxide. Examples of the solid electrolyte include stabilized zirconia, stabilized ceria or combinations thereof. It should be understood that individual chemical phases may further react amongst themselves to create more complicated chemicals such as a ruthenium oxide contained as a component of stabilized zirconia solid electrolyte particles. The preferred method of manufacture is based upon the controlled hydrolysis of solutions and dispersions containing the appropriate metal elements. The use of solgel technology is preferred in such manufacture. The intimate mixture of very high surface area particles results in acceptably high rates of electrocatalysis of fuel materials such as hydrocarbons, alcohols and similar fuel materials and components.

Application of Electrode Layers

Following the dipping and firing of the base and seal coats and solution, and the addition of an electrocatalyst in appropriate embodiments, electrode layers 112e are applied. The electrode layers are made of silver paste, or suitably alloyed silver paste such as Ag—Pd, Ag—Pt or a silver cermet such as Ag-10 percent TZ-8Y zirconia powder. Following the electrode layer 112e, a current collector 111 is provided which is in electrical communication with the dimples of the same cell 12 and an adjacent cell 12. The current collector 111 is preferably a silver mesh or perforated or embossed silver sheet, or other materials and forms which permit gas to pass and electrons to flow concurrently.

The elements of the cell may thus be as illustrated in FIG. 16C, with the ceramic composite material 61, comprising the metal ligaments of the honeycomb section 80 of the photolithographic foil member 60 (shown in cross-section), base coat B, seal coat C and fired seal solution within the base and seal coats, which together form the solid electrolytic composite. The material 61 is preferably coated on at least one side, in the fluid fuel embodiment, with the electrocatalyst 122. Separate electrode layers 112e are then provided on each side of the material 61. The current collector 111 layer may then be optionally provided on one or both sides of the material 61. On the fuel side, where a current collector 111 may be optionally included, it is interspaced between the electrode layer 112e and the bipolar foil member 50 of the cell for engagement with the small dimples 66 of the bipolar foil member 50. On the air side, where a current collector 111 may also be optionally included, it is interspaced between the electrode layer 112 and the bipolar foil member 50 of the adjacent cell of the cell stack 13 for engagement with the large dimples 64 of the bipolar foil member 50. In this configuration, the members 50, 60 are welded W as illustrated. If a current collector 111 is included, the use of a dimple pattern in the bipolar foil member 50 may be eliminated. For the FIG. 1A embodiment using fluid fuels, a current collector on the fuel side of the cells may additionally have the function of controlling the fluid flow field, or travel of the fluid, across the active area of the cell. Such fluid flow control provides desired homogenous current density and efficient consumption of the fuel. Further more detailed aspects of the cell assembly are now described.

Assembly of the Ceramic Composite Cell

Once the coating and firing of the photolithographic member 60 is completed, the components of the cell may be combined together in the following arrangement, which is in part depicted in FIG. 13: first frame member 56, the photolithographic member 60 supporting and incorporated within the ceramic composite material 61, the bipolar foil 50, and the optional second frame member 58. The components are aligned using the alignment holes 68 in each of the components. Alternatively, the cell design may be such that no frame is required, or that only one frame member is used, as illustrated in the embodiment of FIG. 13.

Once aligned, the components are interconnected via a $CO_2$ laser weld W to form a gas tight seal between the welded component layers, including the bipolar foil 50 and the photolithographic member 60 supporting the ceramic material as described and as illustrated. The continuous weld W is located in the metal perimeter 12c inwardly of the embossed or raised portion of the frame to provide the hermetic seal or container for collecting the fuel exhaust generated from the cell 12. An additional weld 120, which may be a non-continuous stitch weld, as shown in the embodiment of FIG. 5 may also be used. It should be understood that the metal to metal seals indicated are preferably $CO_2$ laser welded, however, numerous alternate techniques may be used, such as other welding, brazing, soldering, crimping or bonding techniques. The weld must provide a hermetic and permanent gas tight seal for efficient operation of the cell.

Assembly of the Device

Once manufactured, the number of cells 12 necessary to obtain the desired power requirement, having the desired cell size and current density and other characteristics, are then aligned using the frame alignment holes 86 into a stacked arrangement. Each of the stacked cells has an anode side and a cathode side as previously described, and forms layers of gas plenum chambers positioned on alternate sides of each cell 12 within the device 10. Ambient air is fed to the cathode 16 of the cell 12 via an air plenum chamber, and electrical power is generated between the electrodes as illustrated in FIG. 2. The air plenum chamber is preferably approximately 0.010 to 0.100 inches thick, with the cell 12 having an overall thickness of approximately 0.050 to 0.200 inches.

As previously discussed, once stacked, the cells 12 are electrically connected via the electrical contact layers 112 on the dimples 64, 66 of the bipolar foil 50, and the electrode layer 112e on both sides of the ceramic composite material of the photolithographic foil member 60. Thus, in the illustration of FIG. 2, the cathode 16 supported on the member 60, contacts the contact layers 112 of the large dimples 64 of the bipolar foil 50 of an adjacent cell 12. Incoming air flows in the air plenum intermediate the cathode 16 and the adjacent cell. The anode 18, supported on an opposite side of the member 60 from the cathode 16, contacts the contact layers 112 of the small dimples 66 of the bipolar foil 50 of the same cell 12. The anode 18 side of the ceramic composite material 61 and the small dimple side of the same cell form the gas tight plenum or chamber where the electrical power is generated as indicated. In a design of the type discussed, about 0.05-0.75 amps flow through an active area of the ceramic composite material of about 1 $cm^2$. Since the ohmic drop across the electrical contact layers 112 is measured in milliohms, it is important to reduce any relatively electrically resistive oxide formation on the material of the bipolar foil 50. Additionally, it is noted that the preferred embodiment of the present device 10 experiences pressure drops between the cells 12 during operation. The principal pressure drops occur along the air plenum and the fuel exhaust plenum. As a result, an approximately inverse cubic relationship exists between the pressure drop and the flow rates, such that the large dimples 64 and the small dimples 66 of the bipolar foil member are sized according to this relationship.

Figure 26:
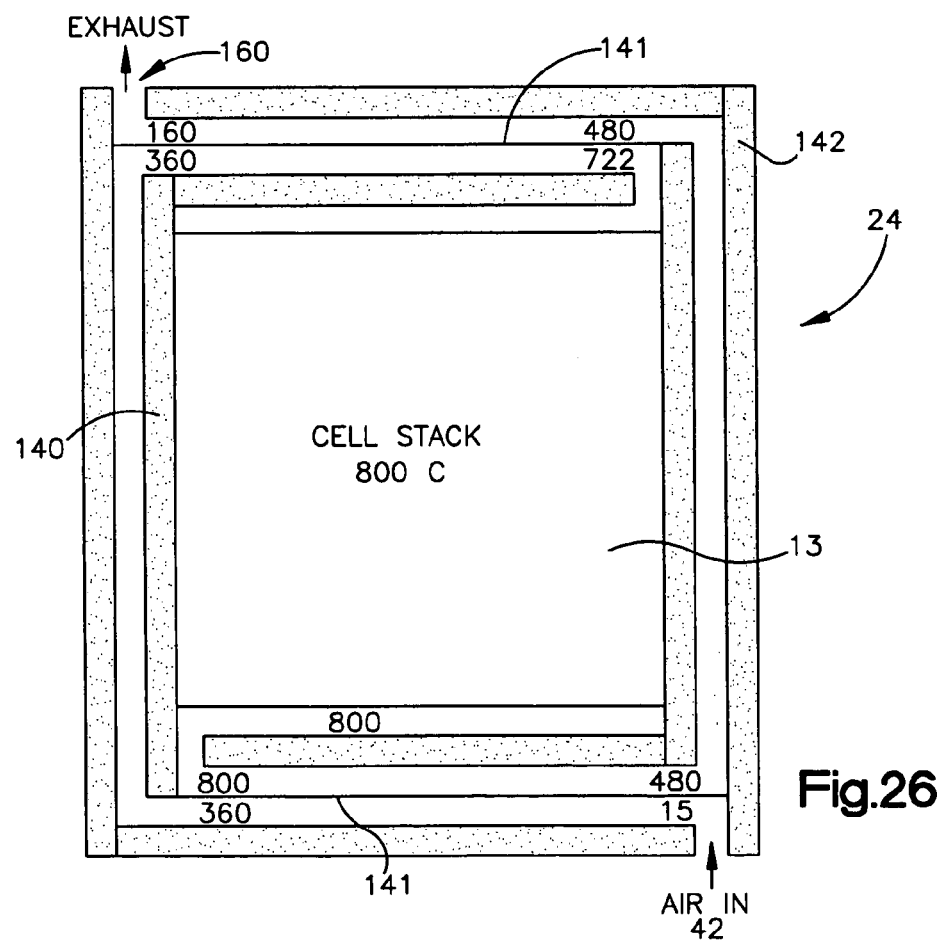
FIG. 26 is a schematic, cut-away top view of the cell stack and thermal shell of the device of FIG. 24 which also illustrates the temperature gradients along the air flow path of the device.
Figure 26A:
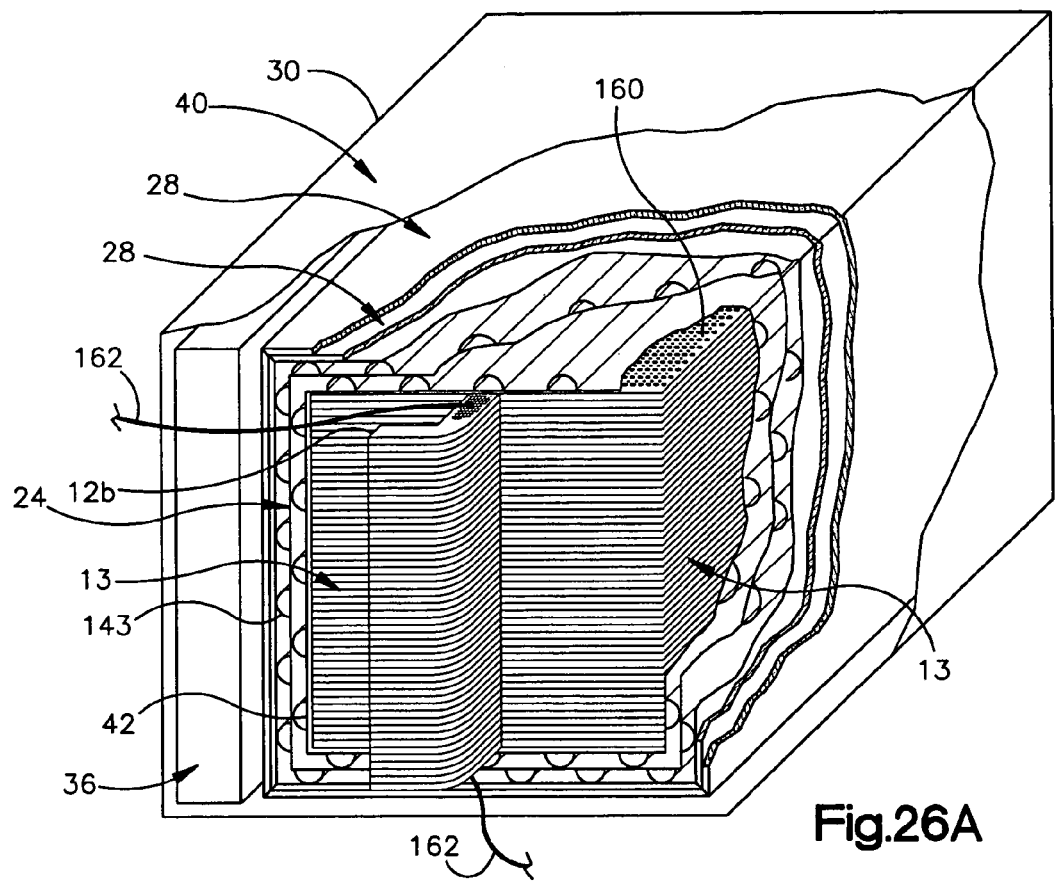
FIG. 26A is a partial, schematic, cut-away view of the cell stack and thermal shell of the device.
Figure 26C:
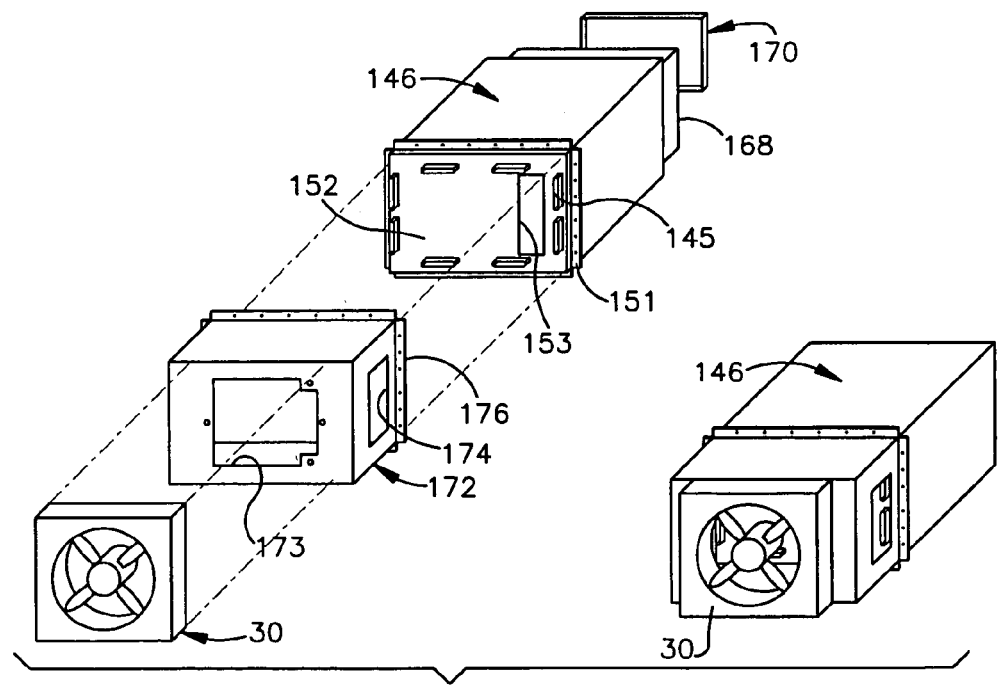
FIG. 26C is a partial, schematic exploded view of steps A-B of assembly of the thermal shell with the fan assembly of the device.

To draw power from the cell stack 13, a thin layer, nominally 1/16 inch, of silver, which may have the configuration and at least one dimension of the dimple pattern 52 of the bipolar foil 50, may be provided on the top and bottom 160 of the cell stack 13, or alternatively, as illustrated in FIG. 26A, a layer of current collector 111 is provided on the top and bottom of the stack 13. On the opposite end of the stack a layer of current collector 111 may also be used. A lead 162 is easily interconnected with the current collector 111 via the use of the silver material used on the photolithographic member 60. The silver is applied in a manner to bond the lead 162 and silver cermet material.

Figure 26B:
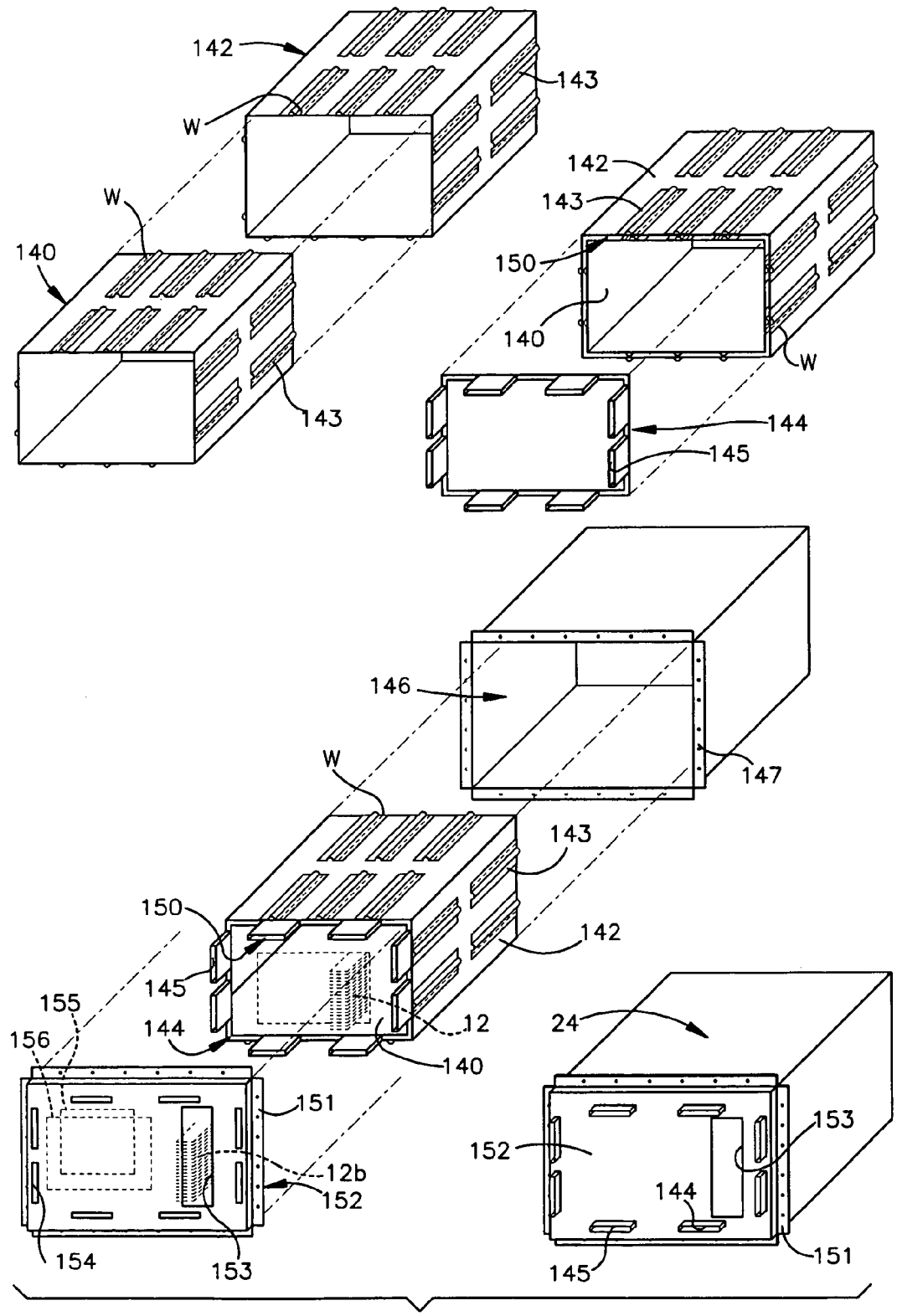
FIG. 26B is a partial, schematic exploded view of steps A-D of assembly of the thermal shell of the device.
Figure 26D:
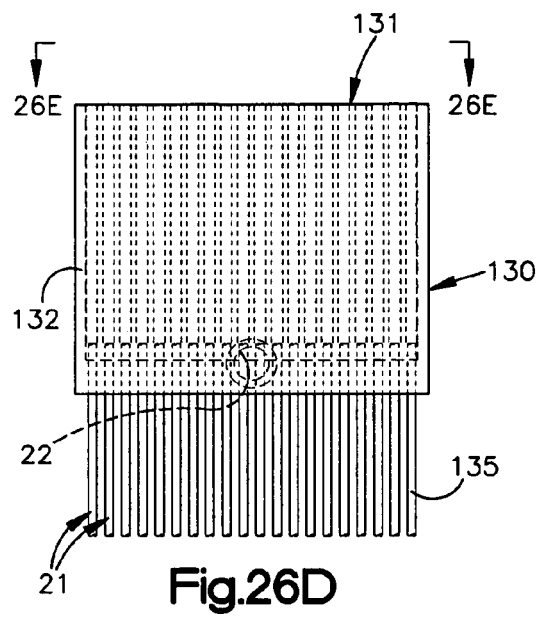
FIG. 26D is a top plan view of a gas manifold of the device of the present application.
Figure 26F:
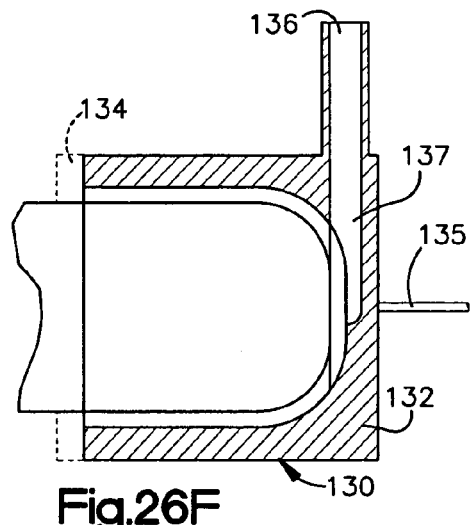
FIG. 26F is a cut-away view of a gas manifold of FIG. 26F taken along the line A-A of FIG. 26E, and showing the cell arm engaged therein.
Figure 26E:
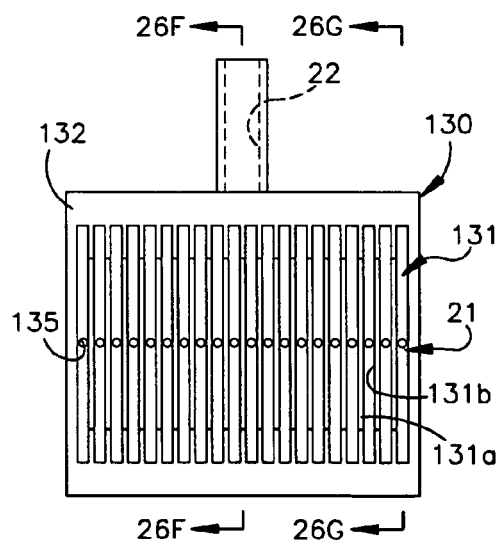
FIG. 26E is a plan view of a gas manifold of FIG. 26E taken along the line E-E of FIG. 26D.
Figure 26G:
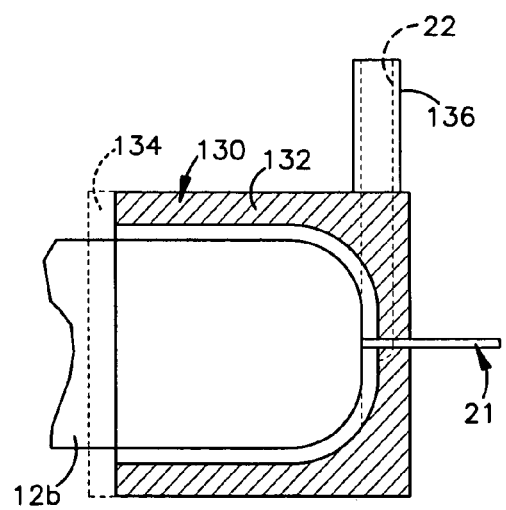
FIG. 26G is a cut-away view taken along line B-B of FIG. 26E.

In order to ensure that no direct electrical contact is made between the arms of the cells 12, and that proper gas input and exhaust are provided, a gas manifold 130 or slotted sleeve is provided engaged with each of the arms. The gas manifold 130 of the present application is illustrated in FIGS. 26D-26F. In the illustrated embodiment, the manifold is a one piece design. However, the device may include the same elements but with three (3) components, which are discussed as follows. An inner slotted sleeve 131 having spaced members 131a forming slots 131b for receiving and engaging each of the cell 12 arms 12b, a manifold shell 132 for receiving the slotted sleeve 131 engaged with the cell arms 12b, and a silicone rubber RTV cover layer 134 for closing and sealing any open portions of the slotted sleeve and manifold shell to prevent the release of exhaust gas from the manifold other than through an outlet 136 provided in the manifold shell 132. The outlet also extends in part within the manifold shell forming a groove 137 which receives exhaust gas from the cells to the outlet 136. The outlet 136 is sized to receive a nominally 1/4 inch tube fitting.

In the preferred embodiment, the gas manifold sleeve and shell components 130, 132 illustrated, are manufactured of injection molded silicone rubber, and function as redundant o-rings. The manifold and its components may alternatively be manufactured of a metal material, which enables it to also function as a heat exchanger, which keeps the ends of the arms 12b cool. In the illustrated manifold, each of the spaced members 131a is biased into engagement with the adjacent arm 12b. In a three component embodiment, the inner surface of the manifold shell 132 and outer surface of the slotted sleeve 130 would include mating grooves and ridges respectively, for isolating the arms 12b and providing sealing engagement limiting gas flow to the outlet 136. The parts may be coated with a silicone rubber RTV adhesive prior to being permanently snapped together, and applying the cover layer 134 for sealing the output passageways 22 of the cell arms 12b. The manifold 130 has temperature tolerances in the range of 250°-350° C. It is noted that more than one gas manifold may be used in an alternate embodiment to reduce the number of cells engaged with each manifold. Such an arrangement may be desired to provide engineering redundancy within the device 10, depending on the specific application desired.

The gas manifold 130 is additionally provided with fluid fuel input passages 135, which are interconnected with the fuel supply 20. As illustrated, the fuel supply provides fluid fuel F to the manifold via the passages 135, which are in communication with the fuel inlet 22 portion of the cell 12, for example in the embodiment of FIG. 16.

As previously discussed, each of the arms 12b of the cells 12 are trimmed at the ends to ensure proper fluid ingress and egress is provided to and from the cells, via gas output passageway 22. Additionally, free access to the resistive heat elements if present 62 must be provided for interconnection with a power source. Each arm and frame and bipolar foil member of each cell 12 is electrically interconnected with the other stack cells only via the electrolytic path of the cell stack. It is noted that the arms 12b provide desired heat exchange for increased cooling during operation of the device 10.

The stack 13 of cells 12 is partially or fully provided within a thermal shell 24, which has a co-flow or counterflow, preferably wrap around design for obtaining desired heat exchange, as illustrated in the co-flow embodiment of FIG. 26. In the thermal shell 24, the ceramic composite cells 12 are preferably stacked in electrical series and gas parallel surrounded first by an initial insulating material 28, which may be an alumina foam setter plate or a thin steel sheet or foil. In the embodiment of the device of FIGS. 24-25, additional optional heat elements may be provided which may comprise two heating plates having embedded resistance wires available from Thermolyne. One plate may be engaged on top of the initial insulation of the cell stack, the other on the bottom. These heat elements serve to heat the cell stack from the outside in, rather than heating each individual cell or placing heat elements throughout the stack. Since successful operation of the device is typically dependent on maintaining temperatures within the cell stack in excess of 500° C., the use of an additional optional heat element 14 is dependent on the desired device output. Once the cell stack and insulating materials are assembled, they are inserted into the thermal shell 24.

Figure 24:
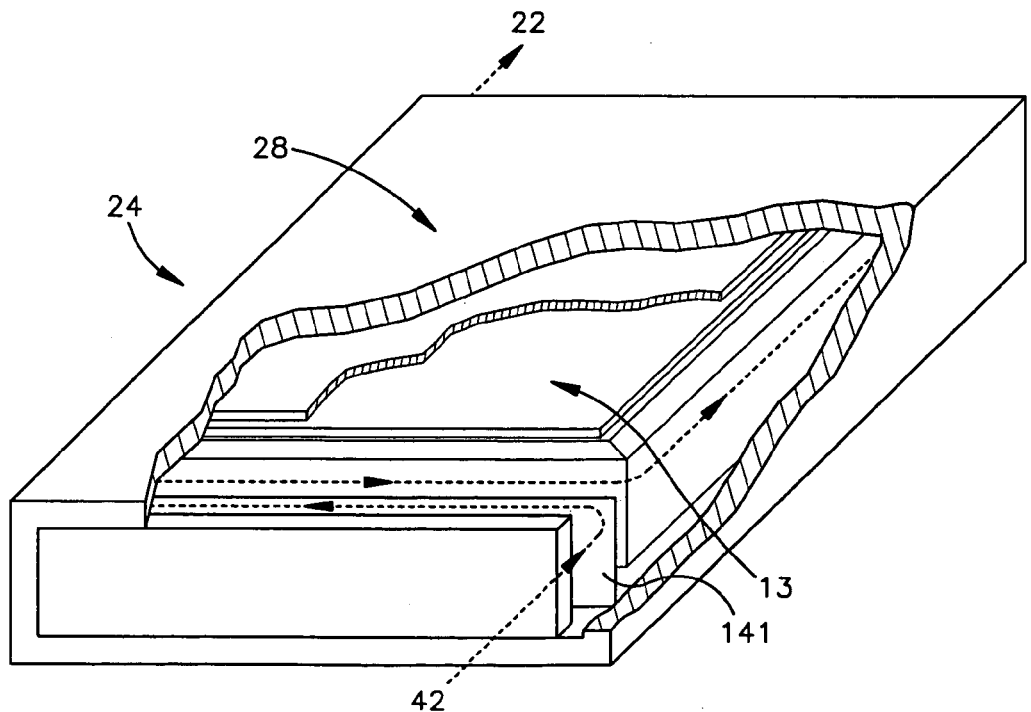
FIG. 24 is a partial, schematic, cut-away view of the cell stack and thermal shell of the device.
Figure 25:
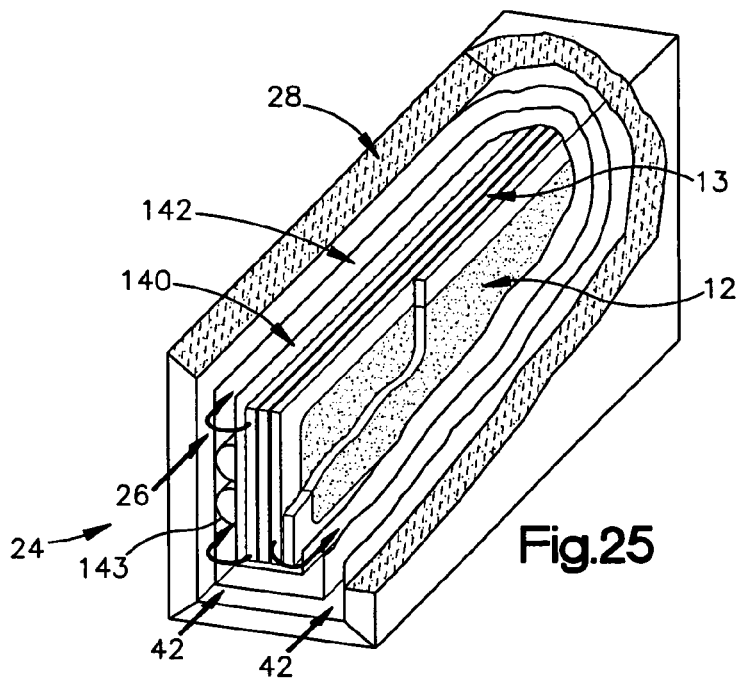
FIG. 25 is a partial, schematic, cut-away view of an alternate embodiment of the cell stack and thermal shell of the device.

The stacked cells are illustrated in FIG. 25, while the arrangement of the thermal shell components is further shown in FIG. 24. In the thermal shell 24, a stack shell duct member 140 surrounds the insulated cells 12, which is then surrounded and engaged by an exhaust duct 142. The ducts are each manufactured of 0.008 inch Alpha IV steel or 0.0155 inch Inconel 600, and are slid into engagement. The external surfaces of the ducts each include partial cylindrical spacers 143 to provide air spacing for heat exchange between the ducts, and also as shock absorbing materials 26. The spacers are welded to their respective ducts as indicated at W, such that only one leg of the spacer 143 is welded and the other is movable with respect to the duct to permit flexing of the spacer under compression.

The space inside the stack duct 140 and cell stack provides an incoming air passageway 42. The space outside the stack duct 140 provides an exhaust air passageway 150. A gas bypass 144 is provided, which is a ring member having rectangular openings 145 extending therefrom for directing exhaust air flow as illustrated in FIG. 26B via the openings 145. Additionally, foil heat exchange elements 141 or gas bypass elements are hermetically welded to the stack and exhaust ducts, such that hot exhaust gas is removed from the device only after wrapping through the thermal shell for cooling purposes as in FIG. 26. The resulting gradient heated and cooling temperatures are illustrated at various locations along the thermal shell to indicate the cooling effect provided.

The ducts assembled in step B of FIG. 26B are then inserted into the incoming duct 146, which is secured about a flange 147 to the flange 148 of an incoming cap 152 by conventional fasteners. A further incoming air gap 42 is provided intermediate the exhaust duct 142 and incoming duct 146. The incoming cap 152 includes a stack opening 153 for receiving the arms 12b of the stacked cells 12. Openings 154 for mating engagement with the openings 145 in the gas bypass 144 are also provided. To ensure sealing surrounding the incoming cap openings 154 and the gas bypass openings 145, a layer of Interam™ sealing material available from 3M Corp., is provided between these members.

Intermediate the stacked cells 13 and the incoming cap 152, two additional components to increase the temperature within the cell stack may also be provided. Closest the stacked cells a conventional finned heat sink 155 is provided. Immediately adjacent the heat sink, a conventional mica heater 156 may be provided of the type available from Minco.

To ensure sealing surrounding the incoming air and exhaust openings, Aerogel or Microtherm insulation having a very low thermal conductivity, such as 0.02 W/MK at 400° C., and very low weight, is also preferably provided surrounding the shell 24.

To seal the end of the thermal shell 24 adjacent the incoming air, a layer of Interam™ sealing material 168 is provided between the incoming duct 146 and an exhaust cap 170. Upon heating, the Interam material 168 expands to lock the exhaust cap 170 in place and torm a nominally gas tight seal to prevent leakage.

The exhaust fan 30, a conventional fan capable of drawing approximately 60-65 liters per minute of air through the device 10 for the design requirements of the preferred embodiment, is included on the incoming cap 152 end of the thermal shell 24. The fan 30 is attached to a fan duct 172 via conventional fasteners over a fan opening 173. The fan duct additionally includes an incoming air access 174. A flange 176 of the fan duct 172 is then secured to the flange 151 of the incoming air cap 152 via conventional fasteners. Once these components are assembled, additional layers of high temperature (closest to the cell stack) and lower temperature insulation materials 28 are provided. The assembly may then be placed within the external container 40. As illustrated in FIG. 25, the additional insulating material 28 used may also be a polyimide thermal insulation sheet. Further shock absorbing materials 26 are also found in the threaded posts which engage and are secured to the container 40, and sandwich the thermal shell 24 positioned within the container 40 using the conventional fasteners.

Figure 23A:
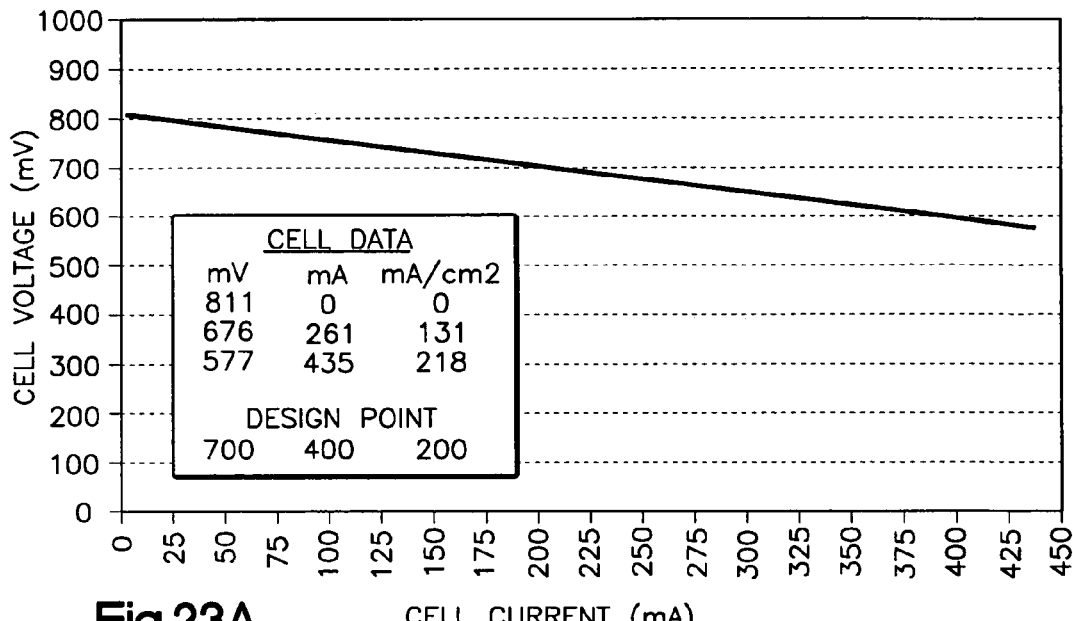
Figure 23B:
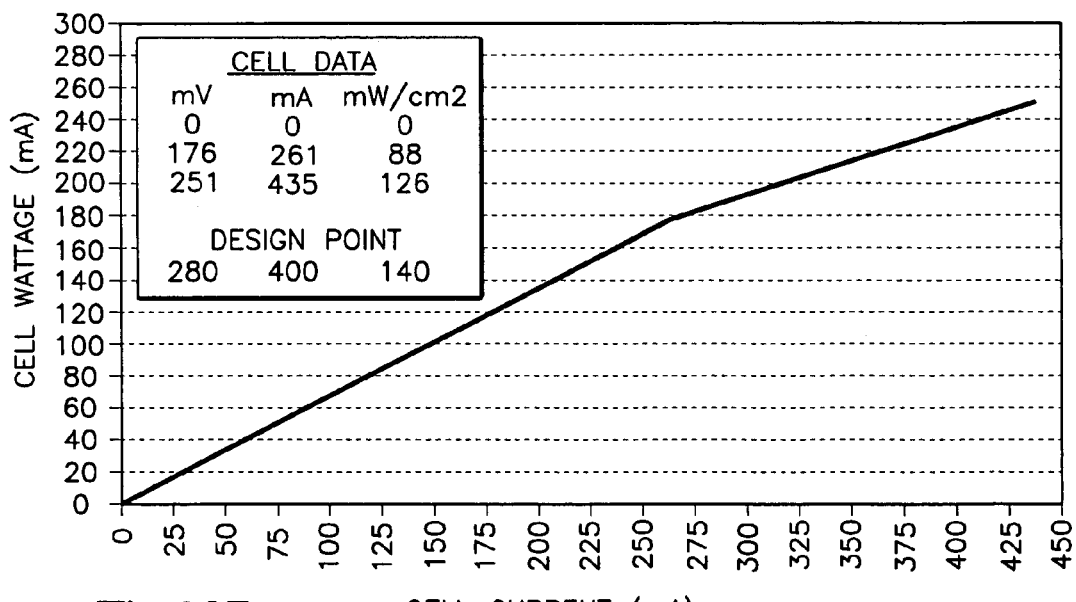
Figure 23C:
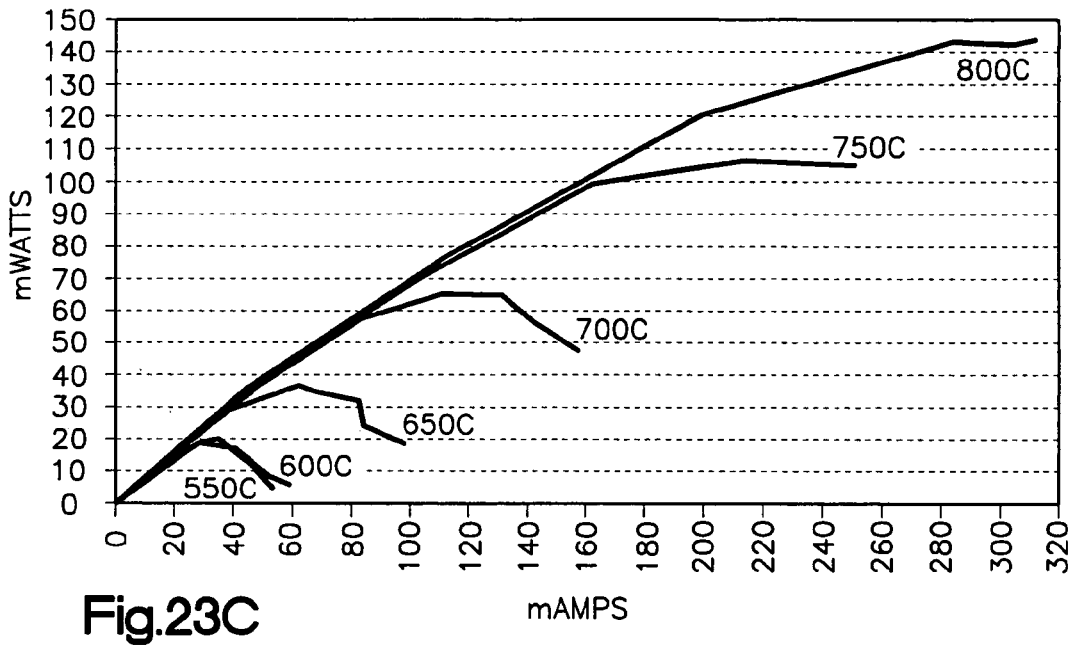

Once the device is assembled, and heated to the operating temperatures indicated in FIGS. 23A-23C, operation of the device is tested to quantitatively confirm electrical power output FIGS. 23A-23B illustrate the operation of a device containing solid pre-loaded powered carbon fuel. The results are provided in current versus voltage in FIG. 23A, and for wattage versus current in FIG. 23B. In FIG. 23C, the cell tested was fueled with methane, which is the principal component of natural gas. The graph shows watts versus amps as a function of the temperature of the cell, which was operated at the temperatures indicated. As will be well understood by one of ordinary skill in the art, the highest currents and the highest wattage were obtained at the highest temperatures. It is noted that initial start-up heating may be provided by a number of heating techniques, such as resistive heating using a battery, or other electrical power source. Alternatively, initial heat-up may be effected may be combusting a portion of the fluid fuel and using the resulting enthalpy to pre-heat the cell stack 13 to nearly operating temperature.

Control and Operation of the Electrical Power Generating Device

To operate the device and obtain electrical power from the output 44, the user operates the computer user interface 38 to power on/off the device 10. The computer user interface 38 and output 44 are supported within the metal container 40 which surrounds the components of the device. In the preferred embodiment, the output 44 includes a conventional outlet fitting 45. As shown in FIGS. 1-2, once in the on position, the operator is provided with an LCD display 180 providing output and operation status data. The LCD screen displays stack current (nominally 0-18 amps), stack voltage (nominally 0-12V), stack heat element status (on/off), and the stack temperature (nominally 500°-1200° C.). Using these data, the operator, in the fluid fuel embodiment of FIG. 1A, is able to increase and decrease the fluid fuel supply provided to the cells using a dial 182 to correspondingly increase and decrease the amount of resulting electrical power. The control of output is illustrated in the graph of FIG. 27 which shows the control provided to the operator during use of the device 10.

To operate the device and obtain the reaction of FIG. 2 for electrical power generation, the cells are heated via the heating elements 62. Air flow is also provided by a fan 30 in the direction indicated in FIG. 7 and as previously described. Additionally, the cells must be maintained at a high temperature, preferably in the range of 500° C. to 1200° C., with especially preferred in the range of 600° C. to 950°. In addition to the individual heat elements in the cell stack 13, still further heat elements may also be provided, such as a mica heater near the air inlet 42 to the cell stack 13, or by combusting some of the fluid fuel and passing the hot exhaust gas over the cell stack or thermal shell 24.

The power source 34 providing electrical power for initial and trim heating the cells may be a conventional AC power line. The preferred device may be operated using 110 or 120 V electrical power. The exhaust fan 30 may be connected directly to the power source, or, in the event programmed computer control of fan operation is desired, powered through a power supply. The remainder of the electronic control operation is set forth in FIG. 27.

The temperature is controlled by sensing the internal temperature of the device during operation. Thermocouple sensors 32 are secured appropriately within the center of the cell stack, as shown in FIG. 27. They may be positioned at various and multiple locations across an individual cell, and also placed at various vertical intervals spaced through the stack. The sensors 32 are interconnected with the computer controller 36, positioned within the container 40, to provide system and user feedback using operating information concerning the temperature. Based on the sensed temperature, additional heat is provided to the stack, or the fan is operated or varied to cool the stack to the desired and preprogrammed operating temperature.

Using the conventional programmable computer controller 36 including interconnected control circuitry, once the device is turned on, cell stack 13 is heated to a pre-programmed operating temperature and held it at that temperature using the sensors and feedback controls discussed and illustrated in FIG. 27, which illustrates a fluid fuel system of the type shown in FIG. 1A. In the event a solid fuel system is used, system data are provided to the user, but no fuel flow ingress adjustments may be made. Once the cell stack 13 achieves operating temperature, and power is drawn from the device 10, electrochemical oxidation of the fuel as shown in FIG. 2 results in heat generation. The controller then maintains the stack temperature by cutting off power to the heat elements, and increasing or decreasing the fan speed to provide appropriate air cooling to the stack. Additionally, the fuel circuit 20A referenced in FIG. 27 would not be provided in the event of the use of a solid fuel.

In the solid fuel embodiment, the fuel, such as carbon powder, is pre-loaded into the cells during their manufacture. Once the solid fuel is used within each of the cells 12, the cell is spent, and is generally discarded and replaced with a new pre-loaded cell. In the case of a system embodiment using the liquid, gas or vapor fuels, this is generally not the case. The liquid, gas or vapor fuel cells may be reused as they are re-supplied with additional fuel from the fuel supply 20. In this type of system, user adjustment using the controller 36 may be provided with respect to the rate of fuel ingress. The controller 36 may be a Parallex Basic Stamp II microprocessor, or other CPU.

In the fluid fuel cell embodiment, once the cell stack 13 is at the desired temperature, the fuel adjustment may be used to increase and decrease the fuel supplied from the fuel supply 20 to the cell stack 13. When fuel is applied to the stack, the voltage measurement monitors the performance of the stack which is highly dependent on the operating temperature, and the electrochemical potential generated by the difference in oxygen concentration across the solid electrolyte. It is noted that a current disable feature may be provided such that the current is disabled unless the stack is at the appropriate operating temperature.

The temperature set point, warm-up rate and maximum heating rate may be pre-programmed such that the user cannot make operational changes. Alternatively, the device may be adjustable, such that programming changes are possible.

The preferred forms of the device 10 has been described above. However, with the present disclosure in mind it is believed that obvious alterations to the preferred embodiments, to achieve comparable features and advantages in other assemblies, will become apparent to those of ordinary skill in the art.

We claim:

1. A method for manufacturing a ceramic composite oxygen or power generating cell comprising
providing a first metal member having a perimeter and a section defining a pattern of openings;
applying a ceramic material to the section,
firing the ceramic material to create a ceramic composite body;
coating at least a portion of the ceramic composite body with an electrically conductive material;
firing the electrically conductive material to form an electrode layer;
providing a bipolar metal member having contact portions extending outwardly in one or two directions from a plane of the bipolar metal member for engagement with the ceramic composite body;
connecting the bipolar metal member to the perimeter of the first metal member of the ceramic composite body wherein a gas tight chamber is formed between said ceramic composite body and said bipolar metal member.

2. The method of claim 1, wherein the step of applying the layer of ceramic material to the pattern of openings comprises dipping.

3. The method of claim 1, wherein the bipolar metal member and the first metal member of the ceramic composite body form an output for removing exhaust generated in said fuel chamber of said cell.

4. The method of claim 1, further comprising applying an electrocatalyst layer to the ceramic material of the ceramic composite body.

5. The method of claim 1, further comprising providing a current collector between the electrode layer and the bipolar metal member.

6. The method of claim 1, further comprising sealing the ceramic composite body with seal slip coat.

7. The method of claim 1, further comprising attaching at least one metallic frame to said bipolar metal member.

8. The method of claim 1, wherein the gas tight seal is formed by welding.

9. The method of claim 1, further comprising forming three dimensional structures on the surface of the bipolar metal member.

10. The method of claim 1, wherein the three dimensional structures are formed by embossing.

11. The method of claim 1, wherein the pattern of openings is formed by photochemical etching or photolithography.

12. The method of claim 1, further comprising
sealing the ceramic composite body with a seal slip coat;
attaching at least one metallic frame to said bipolar metal members for supporting said bipolar member,
wherein the bipolar metal member has three dimensional structures on the surface thereof and an electrical contact layer disposed on said three dimensional structures, and further wherein the metal member of said ceramic composite body has a thickness of from 0.001 to 0.008 inches.

13. The method of claim 12, further comprising providing an output for removing exhaust generated in said cell;

providing a heat unit for heating said cell to a desired reaction temperature;

providing a fan for supplying air; and providing at least one arm extending from the ceramic composite body.

14. The method of claim 1, wherein the pattern of openings is a hexagonal close pack cell pattern, and further wherein the first metal member has a thickness of from 0.001 to 0.008 inches.

15. The method of claim 12, further comprising:

providing a fluid fuel input in an arm;

providing a gas output in an arm;

wherein:

the fluid fuel input and the gas output are in the same or different arms.

16. The method of claim 15, further comprising applying an electrocatalyst layer to the ceramic material of the ceramic composite body.

17. The method of claim 1, further comprising disposing solid fuel between the bipolar metal member and the first metal member of the ceramic composite body.

18. The method of claim 1, further comprising applying an electrocatalyst layer to the ceramic material of the ceramic body, and further wherein the electrode layer comprises silver or a mixture of silver and a second metal selected from the group consisting of gold; platinum; palladium; iridium; and mixtures thereof; and the electrocatalyst layer is comprised of a mixture of solid electrolyte particles and transition metal oxide particles.

19. A method of manufacturing a ceramic composite oxygen or power generating cell stack comprising (a) providing at least two ceramic composite cells, a first cell and a second adjacent cell, each cell comprising:

a ceramic composite body comprising a first metal member having a pattern of openings formed within a portion of the metal member and a ceramic material disposed on said pattern of openings;

first and second electrically conductive porous gas permeable electrode layers on opposite surfaces of said ceramic composite body, said first electrode layer forming an anode and said second electrode layer forming a cathode;

a bipolar metal member for engagement with the ceramic composite body of said first cell on one side and with the ceramic composite body of the second cell on the other side;

wherein said bipolar metal member and said first metal member are interconnected at a gas tight seal surrounding said ceramic material to form a gas tight chamber and together forming an output for removing exhaust generated in said gas tight chamber of said cell; and (b) interconnecting the ceramic composite cells so that said ceramic composite cells are arranged in electrical series and gas parallel.

20. The method of claim 19, further comprising disposing said stack at least partially within a thermal shell.

21. The method of claim 20, wherein said thermal shell has a first, a second and a third concurrent metal layer.

22. The method of claim 20, further comprising surrounding said stack with insulating material before inserting said stack into the thermal shell.

23. The method of claim 19, further comprising providing at least one current collector interspaced between an electrode layer of one cell and the bipolar metal member of the adjacent cell.

24. The method of claim 19, further comprising providing a heating element to each end of the stack.

25. The method of claim 19, further comprising disposing said stack at least partially within a thermal shell;

surrounding said stack with insulating materials before inserting said stack into the thermal shell;

providing at least one current collector interspaced between an electrode layer of one cell and the bipolar metal member of the adjacent cell; and providing a heating element to each end of the stack.

26. The method of claim 25, wherein the cells further comprise:

three dimensional structures on the surface of the bipolar metal member;

ceramic composite member with seal slip coat;

at least one metallic frame to said bipolar metal member, for supporting said bipolar member, wherein the metal member of said ceramic composite body has a thickness of from 0.001 to 0.008 inches.

27. The method of claim 25, wherein the cells further comprise:

an output for removing exhaust generated in said cell;

a heat unit for heating said cells to a desired reaction temperature;

a fan for supplying air;

at least one arm extending from the ceramic composite body.

* * * * *